(12) United States Patent
Waner

(10) Patent No.: US 10,176,533 B2
(45) Date of Patent: Jan. 8, 2019

(54) INTERACTIVE CHART UTILIZING SHIFTING CONTROL TO RENDER SHIFTING OF TIME DOMAINS OF DATA SERIES

(75) Inventor: Richard Chadwick Waner, Columbus, OH (US)

(73) Assignee: Prevedere Inc., Columbus, OH (US)

( * ) Notice: Subject to any disclaimer, the term of this patent is extended or adjusted under 35 U.S.C. 154(b) by 0 days.

(21) Appl. No.: 13/558,333

(22) Filed: Jul. 25, 2012

(65) Prior Publication Data

US 2013/0060603 A1 Mar. 7, 2013

Related U.S. Application Data

(60) Provisional application No. 61/512,405, filed on Jul. 28, 2011, provisional application No. 61/511,527, filed on Jul. 25, 2011.

(51) Int. Cl.
*G06Q 40/00* (2012.01)
*G06Q 30/02* (2012.01)

(52) U.S. Cl.
CPC ......... *G06Q 40/12* (2013.12); *G06Q 30/0202* (2013.01)

(58) Field of Classification Search
CPC ......... G06Q 10/00; G06Q 40/00; G06F 17/60
USPC ....................................... 705/7.39
See application file for complete search history.

(56) References Cited

U.S. PATENT DOCUMENTS

| | | | | |
|---|---|---|---|---|
| 5,432,530 A | * | 7/1995 | Arita et al. | 345/159 |
| 5,454,371 A | * | 10/1995 | Fenster et al. | 600/443 |
| 5,475,851 A | * | 12/1995 | Kodosky et al. | 715/763 |
| 5,727,161 A | * | 3/1998 | Purcell, Jr. | 705/7.36 |
| 5,793,375 A | * | 8/1998 | Tanaka | 345/426 |
| 6,054,984 A | * | 4/2000 | Alexander | 715/771 |
| 6,064,984 A | * | 5/2000 | Ferguson et al. | 705/36 R |
| 6,133,914 A | * | 10/2000 | Rogers et al. | 345/661 |
| 6,362,842 B1 | * | 3/2002 | Tahara et al. | 715/856 |
| 6,473,084 B1 | * | 10/2002 | Phillips et al. | 345/440 |
| 6,549,864 B1 | * | 4/2003 | Potyrailo | 702/81 |
| 6,614,456 B1 | * | 9/2003 | Rzepkowski et al. | 715/833 |
| 6,757,217 B2 | * | 6/2004 | Eastwood et al. | 367/52 |
| 6,801,199 B1 | * | 10/2004 | Wallman | 345/440 |
| 6,822,662 B1 | * | 11/2004 | Cook et al. | 715/788 |
| 6,901,383 B1 | * | 5/2005 | Ricketts et al. | 705/36 R |
| 7,134,093 B2 | * | 11/2006 | Etgen et al. | 715/786 |
| 7,348,979 B2 | * | 3/2008 | Tso | 345/440 |
| 7,363,584 B1 | * | 4/2008 | Molesky | 715/210 |
| 7,496,852 B2 | * | 2/2009 | Eichorn et al. | 715/764 |

(Continued)

OTHER PUBLICATIONS

SAS/Graph 9.2 Reference—Second Edition.*

(Continued)

*Primary Examiner* — Romain Jeanty

(74) *Attorney, Agent, or Firm* — Kang S. Lim

(57) ABSTRACT

The invention disclosed is a system for providing an aggregated econometric database with selectable sources of economic data. The econometric database is accessible to a system application that graphically displays econometric data over selected periods, and allows display of external economic data in conjunction with internal company metrics. The system applications further provide for identifying the features of indicators, economic and business forecasting, and providing alerts based on the available econometric data.

12 Claims, 34 Drawing Sheets

(56) References Cited

U.S. PATENT DOCUMENTS

| | | | |
|---|---|---|---|
| 7,554,521 B1* | 6/2009 | Migos et al. | 345/156 |
| 7,698,188 B2* | 4/2010 | Hollas et al. | 705/35 |
| 7,800,613 B2* | 9/2010 | Hanrahan et al. | 345/440 |
| 7,818,246 B2* | 10/2010 | Cushing et al. | 705/37 |
| 7,904,376 B2* | 3/2011 | Shapiro et al. | 705/37 |
| 7,941,742 B1* | 5/2011 | Hao et al. | 715/215 |
| 7,991,672 B2* | 8/2011 | Crowder | 705/36 R |
| 7,999,809 B2* | 8/2011 | Beers et al. | 345/440 |
| 8,051,000 B2* | 11/2011 | Kurczek et al. | 705/37 |
| 8,306,847 B2* | 11/2012 | Sperry | 705/7.31 |
| 8,315,938 B1* | 11/2012 | Forsythe | 705/36 R |
| 8,346,682 B2* | 1/2013 | Steed et al. | 706/11 |
| 8,381,090 B2* | 2/2013 | Bruckner et al. | 715/219 |
| 2003/0126054 A1* | 7/2003 | Purcell, Jr. | 705/36 |
| 2003/0212618 A1* | 11/2003 | Keyes et al. | 705/35 |
| 2004/0169638 A1* | 9/2004 | Kaplan | 345/156 |
| 2005/0021485 A1* | 1/2005 | Nodelman et al. | 706/21 |
| 2007/0088648 A1* | 4/2007 | Mather et al. | 705/36 R |
| 2007/0156565 A1* | 7/2007 | Singer et al. | 705/37 |
| 2008/0086401 A1* | 4/2008 | Mather | 705/35 |
| 2008/0133313 A1* | 6/2008 | Bateni et al. | 705/10 |
| 2008/0147486 A1* | 6/2008 | Wu | 705/10 |
| 2008/0195930 A1* | 8/2008 | Tolle | 715/227 |
| 2009/0187606 A1* | 7/2009 | Allweil et al. | 707/201 |
| 2009/0216684 A1* | 8/2009 | Helweg | 705/36 R |
| 2010/0100469 A1* | 4/2010 | Buchanan et al. | 705/35 |
| 2010/0138275 A1* | 6/2010 | Bateni et al. | 705/10 |
| 2010/0185976 A1* | 7/2010 | Sadanandan | 715/786 |
| 2011/0007097 A1* | 1/2011 | Williams | 345/661 |
| 2011/0087985 A1* | 4/2011 | Buchanan et al. | 715/771 |
| 2011/0107265 A1* | 5/2011 | Buchanan et al. | 715/835 |
| 2011/0208701 A1* | 8/2011 | Jackson et al. | 707/687 |
| 2011/0283188 A1* | 11/2011 | Farrenkopf et al. | 715/702 |
| 2011/0302112 A1* | 12/2011 | Shan | 706/12 |
| 2012/0159384 A1* | 6/2012 | Zyskowski et al. | 715/790 |
| 2012/0188250 A1* | 7/2012 | Kaplan et al. | 345/440 |
| 2012/0245970 A1* | 9/2012 | Pulido De Los Reyes et al. | 705/7.11 |
| 2012/0317506 A1* | 12/2012 | Zhao et al. | 715/764 |
| 2012/0317509 A1* | 12/2012 | Ludwig et al. | 715/781 |
| 2013/0024170 A1* | 1/2013 | Dannecker et al. | 703/2 |
| 2013/0041792 A1* | 2/2013 | King et al. | 705/30 |
| 2013/0055132 A1* | 2/2013 | Foslien | 715/771 |
| 2013/0086521 A1* | 4/2013 | Grossele et al. | 715/810 |
| 2013/0179739 A1* | 7/2013 | Ikegami | 714/57 |

OTHER PUBLICATIONS

Jelen, Bill, Rev Up to Excel 2010—Upgraders Guide to Excel 2010 Holy Marco! Books, 2010.*
Moyle, Michael et al., A Flick in the Right Direction: A Case Stude of Gestural Input in Behavior and Information Technology, 2005.*
Microsoft Excel 2010 Charts and Graphs—Class Workbook UCSD Biomedical Library Workshop, Unknown Date.*
Basic Usage of SAS/ETS Software to Forecast a Time Series NESUG16: Statistics, Data Analysis & Econometrics, 2003.*
Cyclical Analysis and Exponential Forecasting Simetar, Simulation & Econometrics to Analyze Risk, 2004.*
Lahiri, Kajal, Evaluating Probability Forecasts for GDP Declines 2007.*
Tableau Software Combination Charts Tableau Software, Inc., 2010.*
Tableau Software Forecasting Tableau Software, Inc., 2012.*
Tableau Visual Guidebook Tableau Software, Inc, 2010.*
MacDonald, Matthew, Excel 2003 for Starters—Chapter 9 Pogue Press, O'Reily, Feb. 9, 2009.*
Stolte, Chris et al., Polaris: A System for Query, Analysis, and Visualization of Multidimensional Relational Databases IEEE Transactions on Visualization and Computer Graphics, vol. 8, No. 1, Jan.-Mar. 2002.*
Cognos 8 Business Intelligence—Report Studio User Guide Cognos Inc., 2006.*
SAS/ETS Users Guide Version 8—vol. 1 SAS, Institute Inc., 1999.*
Springer "Business performance forecasting of convenience store based on enhanced fuzzy neural network", Oct. 2008; Neural Computing and Applications, vol. 17, Issue 5-6, pp. 569-578. (Year: 2008).*

* cited by examiner

FIG. 24 huntington\namefn | logout

| | username | first name | last name | email address | created | enabled | reader | writer | admin |
|---|---|---|---|---|---|---|---|---|---|
| ⊕ add user | | | | | | | | | |
| ⊘⊕ | sample.name@gmail.com | Sample | Name | sample.name@gmail.com | 11/1/2010 3:11:24 PM | ☑ | ☑ | ☑ | ☑ |
| ⊘⊕ | sn@nmonet.com | Sample | Name | sn@nmonet.com | 11/1/2010 3:11:24 PM | ☑ | ☑ | ☑ | ☑ |
| ⊘⊕ | sname141@gmail.com | Sample | Name | sname141@gmail.com | 11/1/2010 3:11:24 PM | ☑ | ☑ | ☑ | ☑ |
| ⊘⊕ | sample.name@companym.com | Sample | Name | sample.name@companym.com | 12/21/2010 2:29:36 PM | ☑ | ☑ | ☑ | ☑ |
| ⊘⊕ | name@companypsoftware.com | Sample | Name | name@companypsoftware.com | 1/19/2011 9:37:59 PM | ☑ | ☑ | ☑ | ☑ |
| ⊘⊕ | sample.name@companypsoftware.com | Sample | Name | sample.name@companypsoftware.com | 1/19/2011 9:40:37 PM | ☑ | ☑ | ☑ | ☑ |
| ⊘⊕ | samplename@companypsoftware.com | Sample | Name | samplename@companypsoftware.com | 1/19/2011 9:43:10 PM | ☑ | ☑ | ☑ | ☑ |
| ⊘⊕ | samplenew@companypsoftware.com | globalnames | New | samplenew@companypsoftware.com | 1/20/2011 6:18:59 AM | ☑ | ☑ | ☑ | ☑ |
| ⊘⊕ | samplenew@companyn.com | companynew | New | samplenew@companyn.com | 8/1/2011 11:51:00 AM | ☑ | ☑ | ☑ | |
| ⊘⊕ | sample.new@companyn.com | Sample | New | sample.new@companyn.com | 8/30/2011 4:13:42 PM | ☑ | ☑ | ☑ | |
| ⊘⊕ | anothername@companyn.com | Another | Name | anothername@companyn.com | 9/1/2011 1:57:20 PM | | | | |
| ⊘⊕ | first.name@companym.com | First | Name | first.name@companym.com | 9/1/2011 2:48:51 PM | ☑ | ☑ | ☑ | ☑ |
| ⊘⊕ | second.name@companym.com | Second | Name | second.name@companym.com | 9/1/2011 12:49:24 PM | ☑ | ☑ | ☑ | |
| ⊘⊕ | nc@companydemo.com | Demo | Test | nc@companydemo.com | 10/19/2011 7:32:59 AM | ☑ | ☑ | ☑ | ☑ |
| ⊘⊕ | sample.new@companymedical.com | companym.news | New | sample.new@companymedical.com | 5/2/2012 7:00:00 AM | ☑ | ☑ | ☑ | ☑ |
| ⊘⊕ | sample.new@companyg.com | companygnews | New | sample.new@companyg.com | 5/2/2011 6:18:59 AM | ☑ | ☑ | ☑ | |
| ⊘⊕ | sample.new@companyc.com | companycnews | New | sample.new@companyc.com | 5/2/2011 6:18:59 AM | ☑ | ☑ | ☑ | ☑ |
| ⊘⊕ | sample.new@companyn.com | companymnews | New | sample.new@companyn.com | 5/2/2011 6:18:59 AM | ☑ | ☑ | ☑ | ☑ |

FIG. 28A

INTERACTIVE CHART UTILIZING SHIFTING CONTROL TO RENDER SHIFTING OF TIME DOMAINS OF DATA SERIES

CROSS-REFERENCE TO RELATED APPLICATIONS

This application claims the benefit of U.S. Provisional Patent Application Ser. No. 61/511,527 filed Jul. 25, 2011, U.S. Provisional Patent Application and Ser. No. 61/512,405 filed Jul. 28, 2011, the disclosures of which are expressly incorporated herein by reference.

STATEMENT REGARDING FEDERALLY SPONSORED RESEARCH

None.

BACKGROUND OF THE INVENTION

The present invention relates generally to systems and methods for analyzing econometric data and improving business performance forecasting and decision making related thereto.

According to the Harvard Business Review, approximately eighty-five percent of corporate financial performance is caused by factors external to the business, as opposed to internal actions taken by the company. In a 2009 paper, Gartner, Inc. predicted that, by 2012, more than thirty-five percent of the top 5,000 global companies would regularly fail to make insightful decisions about significant changes in their business markets. Despite this enormous influence exerted by external factors on a company's operations, the current state of the art leaves the companies with little or no systematic and fluid method for understanding how external market forces impact their businesses. When, through much effort, a company does uncover some external factors that may be a driving force for a facet of its operations, it still lacks the ability to leverage this information for strategic planning. As a result, most corporations are not adequately prepared to address changes in economic conditions as they occur resulting in lost opportunity or degraded company performance.

Many companies today have implemented business intelligence solutions to leverage information technology and computing power to provide historical and current views of internal business operations. Business intelligence solutions enable companies to review large quantities of data with respect to a variety of internal metrics and processes. They are used to report on these data so that decision makers can, for example, perform data mining to identify and analyze process inefficiencies, areas of weakness and strength, divisional and product performance, and management performance. The data collected for any given company varies greatly with regard to, for instance, business sophistication, size, industry standards and relevant metrics, competitive considerations, and technical barriers.

Firms routinely monitor financial metrics internal to the business for performance evaluation. The financial metrics can include, for example, sales, profits, and costs, generally. Monitoring and analyzing these many internal metrics can be the key to a firm's long-term success. For example, in some businesses, the cost of goods sold for certain key product lines are vital to the year-to-year performance of the company. Knowing why the cost of goods sold has changed in the past and analyzing its historical trends will ensure that the business leaders are better equipped to manage the company successfully. The ability to predict the future movement of financial metrics is even more valuable to a company.

Macroeconomic metrics, or economic metrics, are statistical measurements of an economy's characteristics. They can be national economy metrics, international economy metrics, industry-specific metrics at various levels, or the like. Economic metrics are used to analyze economic performance and conduct predictive forecasting of the future performance of some other portion of the economy. Economic metrics are generated, produced, cataloged, and published by a plethora of firms, with many key metrics originating with one or more of several government offices such as the Bureau of Labor Statistics, or other private firms such as the National Bureau of Economic Research.

Economic metrics have historically been used in the field of econometrics as a means for explaining historical trends and events, and as predictors of future economic performance. In furtherance of the latter goal, economic metrics are often compared against each other to determine whether one economic metric can be considered to be an indicator of the other economic metric. Economic indicators can be predictive indicators for other economic indicators, or for the economy as a whole. For example, stock market indexes are considered a leading indicator of the general state of the economy: declines in the stock markets signal an upcoming economic downturn, while consistent gains often predate periods of economic improvement.

Economists and corporate financial departments compare the historical values of two economic metrics and statistically analyze them for evidence that one metric is an indicator for the other metric. If a metric is found to be an indicating metric, it can be classified as one of three types of indicating metrics: leading, lagging, or coincident. A leading indicator is an economic metric whose movement is statistically followed by the movement of a second economic metric sometime in the future. Conversely, a lagging indicator is an economic metric whose movement statistically follows the movement of a second economic metric; it changes consistently with the movement of the second metric and before the second metric. Finally, coincident indicators are found when two economic metrics change at approximately the same time.

The change observed in an economic metric is also classified according to its direction of change relative to the economic indicator that it is being measured against. When the economic metric changes in the same direction as the indicator, the relationship is said to be pro-cyclic. When the change is in the opposite direction as the indicator, the relationship is said to be counter-cyclic. Because no two metrics will be fully pro-cyclic or counter-cyclic, it is also possible that a metric and an indicator can be acyclic—i.e., the metric exhibits both pro-cyclic and counter-cyclic movement with respect to the indicator.

More recently, companies have begun to analyze economic metrics to determine if there are indicator relationships between macroeconomic metrics and the company's own internal financial metrics. For example, a company that produces treated lumber may be interested in determining if United States housing starts is an indicator for the internal sales metric. That is, if housing starts begin to climb, can the company expect a climb in sales and production, and if so, how much and when?

The current systems and methods designed to answer these questions pose several problems that are not solved by the prior art. First, data aggregation is a difficult and time-consuming task. Certain macroeconomic metric data sets, such as United States housing starts, are freely available from various sources. New, updated figures are released according to a set periodic schedule. The updated data sets must be obtained and imported into analysis software, such as Microsoft Excel, in order to compare the metrics to determine whether an indicator relationship may be found. Internal company metrics must also be imported into the software to begin the comparison.

The current methods of data aggregation suffer from the problem of disuniformity; that is, the external metrics and internal metrics must be converted to a similar format suitable for conducting indicator analyses. To achieve a comprehensive analysis of any two metrics, it is often desirable to compare not only actual values over time, but also statistical measurements of change, such as month-over-month percent change, year-over-year percent change, and three-month moving averages, for instance. Each new analysis thus creates the need to perform the time-consuming data preparation operations of homogenizing the data sets and calculating all desirable statistical permutations, before conducting an actual analysis.

Some partial solutions have been attempted, but none achieve the goal of quickly preparing data sets for analyses without the need to prepare the data. For example, some companies maintain subscriptions to services offered by the likes of IHS, Inc., Bloomberg Government, Moody's Investor Services, and Thomson and Reuters Corporation. For some macroeconomic metric services, analysis software add-ins are available to fetch and import data at a user's request. These solutions only serve to create a patchwork of data sets spread across a multitude of files. Furthermore, the data sets are not updated automatically and in close temporal proximity to the actual release date. Rather, the data update operation is dependent on a user knowing the release schedule and manually activating the update function.

While, over time, some firms will develop know-how with regard to which external metrics to analyze for insight into their own internal operations, the ability to analyze a large number of external metrics currently requires a significant time commitment. Each iterative step of an analysis essentially requires an analyst to import, convert, and perform statistical permutation operations on the desired metric data sets. The analysis must then be carried out—graphs, charts, and results must be created for each iteration. Therefore, comparing two metrics can place a significant demand on the analyst's time, consequently restricting the number of metric pairs that can be compared. The need for a system and method that greatly increases the speed with which one can perform the necessary comparisons would greatly enhance a firm's ability to obtain knowledge of how external factors affect its operations, thereby heightening the potential for increasing business efficiency and profitability.

Although the current methods of data aggregation and econometric analysis are inefficient, the insight gleaned from those methods is still valuable to the successful operation of a business. Therefore, many businesses conduct such analyses and gain insight into their internal operations due to external driving forces. Some of the same inefficiencies that plague the aggregation of data and the subsequently analysis thereof present further difficulties to companies. If a firm is able to determine a set of external metrics to watch, it continues to remain difficult to act accordingly when the external metrics change over time. For example, the employee in charge of monitoring a particular external metric must manually update the data used in a report to determine if the new information suggests a strategic change in business operations. While some data providers will alert subscribers that updated data sets have been made available, the employee is still required to go through multiple steps to update the relevant reports.

Therefore, while some companies currently have begun to perform econometric analyses to determine which external factors affect internal business operations, and to what extent, the exists a need in the art for more efficient and robust systems and methods for greatly increasing a firm's ability to analyze, monitor, and react to changing external environments. Developments in the field have shown that businesses routinely underestimate or ignore the insight into internal business operations that can be gleaned from external metrics. The present invention seeks to remedy this deficiency and enhance decision-making by providing a unique system and method for improving business performance forecasting and econometric analyses.

BRIEF SUMMARY OF THE INVENTION

The invention is embodied in a method for graphically analyzing econometric data comprising a graphic display produced by rendering a chart area populated by rendering a selectable first econometric data series, and a second econometric data series wherein said econometric data series provides i) a time domain having a plurality of time values, and ii) a value domain having econometric data values for each of the time values in the plurality of time values. The method then utilizes a software system to render a time domain shifting control having time domain drag bar representing the time domain of the first econometric data series and then tracking a magnitude and direction of drag value during a particular dragging event and rerendering the first econometric data series in an updated time domain with the updated time domain defined by adding a time value said time value having a time interval quantity and a time factor that are correlated to the magnitude and integer value of a drag value tracked during a dragging event. Thus, the graphic display allows comparison of the relationship between the first econometric data series and the second econometric data series through an overlapping display of the graphical display of the data series over a time domain versus a value domain. In an alternative embodiment, the method further comprises determining whether lower and upper time domains are within outer boundary parameters, and if said time domains are outside outer boundary parameters, imposing a drag value limit on the dragging event.

The value domain can be embodied as one or more of a day, a month, a quarter, a fiscal year, a calendar year and a reporting period. In a further embodiment, the method further comprises using a first econometric data series that is a macroeconomic or external econometric data series, and a second econometric data series, which is an internal or company econometric data series or a microeconomic econometric data series.

Macroeconomic data series are embodied by, for example data series which GDP, durable goods orders, unemployment, stock market index price, energy price index, foreign trade ratio, domestic production, prime rate, LIBOR, interest on required balances, Fed Finance index, producer price index, or Consumer Price Index, however such list is not exhaustive. The microeconomic or internal metric data series are embodied by one or more of profit, cash on hand, EBITA, Cost of Goods Sold, gross margin, net margin, critical commodity price, average weekly hours worked, wholesale price, retail price, sales or inventory, and said list is likewise not exhaustive.

In yet another embodiment of a system is provided for providing economic data comprising an automated econometric database reporting selected data, the econometric database aggregating data using the steps of selecting indicator data, said indicator data comprising two or more microeconomic indicators and two or more macroeconomic indicators, then for each indicator data entering data source domain information and alternative data source domain information; determining a data query frequency with which to query the data source for updated indicator data; and prior to obtaining the updated indicator data confirming that the indicator data is within preset limit parameters. If the and if the updated indicator data is not within limit parameters, then the alternative data source domain can be queried, the queried data source used to obtain an updated preliminary indicator data. The system then loads the updated preliminary indicator data into a data metric calculator function and performs a data metric calculator function to produce scaled and formatted indicator data, with the econometric database then being updated with the formatted indicator data, and the process being repeated at the data query frequency.

In another embodiment, a method for identifying economic indicators for use in business forecasting comprises providing a formatted econometric indicator database comprised of a collection of econometric data series wherein said econometric data series provides i) a time domain having a plurality of time values, and ii) a value domain having econometric data values for each of the time values in the plurality of time values; rendering a chart area populated by a selectable first econometric data series, and by a selectable second econometric data series, wherein the first and second econometric data series are plotted using one or more of a coincident time value, a fractional time value, or a multiple time value; rendering a time domain shifting control having time domain drag bar representing the time domain of the first econometric data series; tracking a magnitude and direction of drag value during a dragging event; rerendering the first econometric data series in an updated time domain said updated time domain defined by adding a time value said time value having a time interval quantity and a time factor that are correlated to the magnitude and integer value of a drag value tracked during a dragging event; providing graphic functions to allow display of one or more of the actual, inverse, absolute value, or mirror of the value domains relative to the first and second econometric data series; and then comparing the first and second data series following the optional graphic manipulations to render a display of a correlation between the first and second data series, allowing the comparison between the display of the first and second data series to allow identification of one or more of a leading, lagging, cyclic, countercyclic, procyclic or acyclic relationship between the first and second data series.

Finally, the system is embodied to provide economic forecasting alerts comprising providing an updated econometric database, selecting a data set to be monitored for issuing an alert, querying the updated econometric database for the value of the selected data set, selecting parameters for triggering an alert from the group of when the data set is greater than an absolute limit parameter, an instantaneous percentage change of the data set over time, a change in the value of the data set over a given unit of time for a selected number of consecutive months, comparing the value of the data set to the parameters selected for triggering an alert, and issuing an alert to a system user when the parameters selected for triggering the alert are satisfied.

BRIEF DESCRIPTION OF THE DRAWINGS

For a fuller understanding of the nature and advantages of the present invention, reference should be had to the following detailed description taken in connection with the accompanying drawings, in which:

FIG. 24 shows the calendar screen that is activated by the CALENDAR link;

FIGS. 28A-B show the administrator interface activated by the ADMINISTRATOR link.

DETAILED DESCRIPTION OF THE INVENTION

The new system and method is embodied in part by economic indicator analysis and reporting software. The system automates collection of economic, demographic, and statistical indicators that may be used to analyze business prospects and operations. Further, the system is embodied in an automated process of collection, formatting, and collation of company financial, sales volume or sales quantity data, along with a variety of other internal business metrics for a business operation. The system performs analyses of economic data series over time and is useful for identifying leading economic indicators as compared to and correlated with internal financial results or other external metrics. In a further embodiment, a method is provided for identifying the procyclic, acyclic, and counter-cyclic relationships between econometric indicators and company financial and volume data or metrics.

As such, the system provides for displaying leading indicators in user selected chart or graphical formats for analysis and reporting of econometric data. This allows for the collection of forecasts based on economic, demographic, and statistical indicators. A further embodiment is the performance of regression analysis of collated data and user selectable data sets to forecast company financial, sold volume or quantity as compared to historical performance of the selected indicators and company financial, sold volume, or quantity data. The graphical display component of the system allows displays of selected company and indicator forecasts in software based charts for viewing.

Figure 1A:
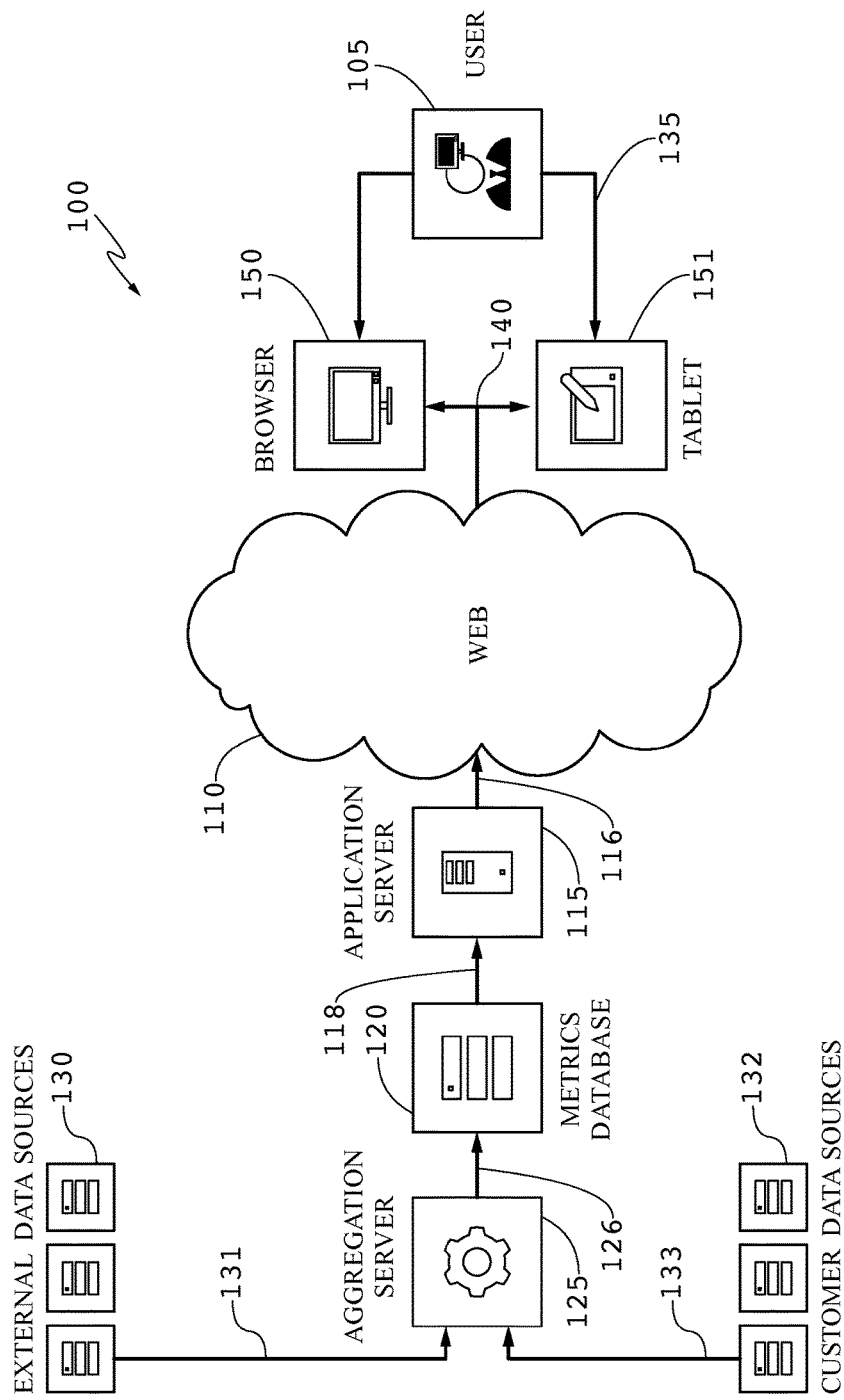
FIG. 1A shows a schematic diagram of the components of an exemplary embodiment of the disclosed data management system.

The system disclosed herein is comprised of a number of physical elements, as shown in FIG. 1A. Econometric data analysis system 100 connects a given analyst user 105 through a network 110 to the system application server 115. An econometric database 120 is linked to the system application server via connection 121 and the econometric database 120 thus provides access to the econometric data necessary for utilization by the application server. The econometric database 120 is populated with econometric data delivered by and through the econometric data aggregation server 125 via connection 126. Data aggregation server 125 is configured to have access to a number of data sources, for instance external data sources 130 through connection 131. The data aggregation server can also be configured to have access to proprietary or internal data sources, i.e. customer data sources, 132, through connection 133.

Network 110 provides access to the user or data analyst (the user analyst). User analyst 105 will typically access the system through an internet browser, such as Mozilla Firefox, or a standalone application, such as an app on tablet 151. As such the user analyst (as shown by arrow 135) may use an internet connected device such as browser terminal 150, whether a personal computer, mainframe computer, or VT100 emulating terminal. Alternatively, mobile devices such as a tablet computer 151, smart telephone, or wirelessly connected laptop, whether operated over the internet or other digital telecommunications networks, such as a 3G network. In any implementation, a data connection 140 is established between the terminal (i.e. 150 or 151) through network 110 to the application server 115 through connection 116.

Network 110 is depicted as a network cloud and as such is representative of a wide variety of telecommunications networks, for instance the world wide web (WWW), the internet, secure data networks, such as those provided by financial institutions or government entities such as the Department of Treasury or Department of Commerce, internal networks such as local Ethernet networks or intranets, direct connections by fiber optic networks, analog telephone networks, or through satellite transmission.

The econometric database 120 serves as an online available database repository for collected data including such data as internal metrics. Internal metrics can be comprised of, for instance, company financial data of a company or other business entity, or data derived from proprietary subscription sources. Economic, demographic, and statistical data that are collected from various sources and stored in a relational database, may reside in a local hardware set or within a company intranet, or may be hosted and maintained by a third-party and made accessible via the internet.

The application server 115 provides access to a system that provides a set of calculations based on system formula used to calculate the leading, lagging, coincident, procyclic, acyclic, and counter-cyclic nature of economic, demographic, or statistical data compared to internal metrics, e.g., company financial results, or other external metrics. The system also provides for formula that may be used to calculate forecast results based on projected or actual economic, demographic, and statistical data and company financial or sold volume or quantity data. These calculations can be displayed by the system in chart or other graphical format. A chart may be displayed showing the various relationships between leading, lagging, coincident, procyclic, acyclic, or counter-cyclic company data when compared to macroeconomic, demographic, or statistical data, for instance. Another set of charting systems is configurable to display forecasted results of company financial, or sold volume or quantity data and economic, demographic, or statistical data as a highlighted plot on a software-based chart that compares the raw or formatted indicator data to a selected indicator.

The software application residing on an application server such as server 115 is provided access to interact with the customer datasource(s) 132 through the econometric database 120 to perform automatic calculations which identify leading, lagging, and coincident indicators as well as the procyclic, acyclic, and counter-cyclic relationships between customer data and the available economic, demographic, and statistical data. Users 105 of the software applications that can be made available on the application server 115 are able to select and view charts or monitor dashboard modules displaying the results of the calculations performed by the system. The user 105 can select data in the customer repository for use in the calculations that may allow the user to forecast future company performance. The types of indicators and internal company data are discussed in more detail in connection with the discourse accompanying the following figures. Alternatively, users can view external economic, demographic, and statistical data only and do not have to interface with company results, at the option of the user.

Data is collected for external indicators and internal metrics of a company through the data aggregation server 125. The formulas built into a software application assist the users 105 to identify relationships between the data. Users 105 can then use the software charting components to view the results of the calculations and forecasts. In certain alternative embodiments the data can be entered into the econometric database manually, as opposed to utilizing the data aggregation server 125 and interface for calculation and forecasting. Users 105 can enter and view any type of data and use the software applications to view charts and graphs of the data.

Figure 1B:
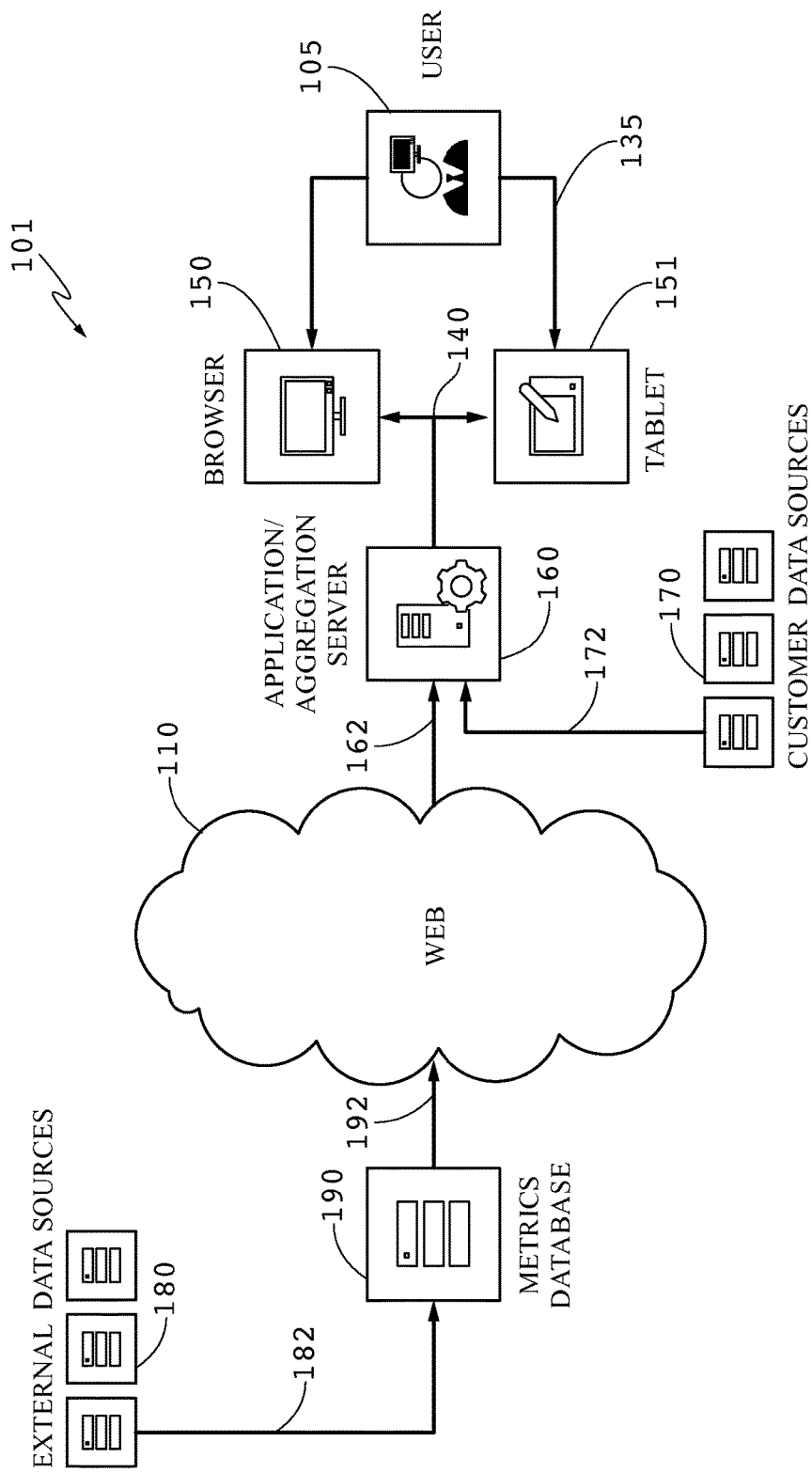
FIG. 1B shows a schematic diagram of the components of a further exemplary embodiment of the disclosed data management system with features for onsite handling of customer data sets.

Alternatively, some system users may have sensitive data that requires it to be maintained within the corporate environment. FIG. 1B depicts components of the system in an exemplary configuration to achieve enhanced data security and internal accessibility while maintaining the usefulness of the system and methods disclosed herein. For example, the economic data analysis system 101 may be configured in such a manner so that the application and aggregation server functions described in connection with FIG. 1A are provided by one or more internal application/aggregation servers 160. The internal server 160 access external data sources 180 through metrics database 190, which may have its own aggregation implementation as well. The internal server accesses the metrics database 190 through the web or other such network 110 via connections 162 and 192. The metrics database 190 acquires the appropriate econometric data sets from one or more external sources, as at 180, through connection 182.

The one or more customer data sources 170 may be continue to be housed internally and securely within the corporate network. The internal server 160 access the various internal sources 170 via connection 172, and implements the same type of aggregation techniques described above. The user 105 of the system then accesses the application server 160 with a tablet 151 or other browser software 150 via connections 135 and 140, as in FIG. 1A.

External data sources 130 and 180 may be commercial data subscriptions, public data sources, or data entered into an accessible form manually. A further discussion of external data sources is described in connection with FIGS. 25-27.

Customer data sources 132 and 170 are represented by a number of data sources that are not generally available for public distribution or consumption. In a preferred embodiment, an electronic interface, as indicated by arrow 133, is set up with a customer's business intelligence system (i.e., customer data source 132) to update the customer data repository in econometric database 120. Typically, the customer data sources will comprise internal business data for a particular operation, such as periodic sales reports, commodity pricing, capacity availability, or other such performance-related metrics. A further discussion of customer data sources is described in connection with FIGS. 25-27.

Figure 2:
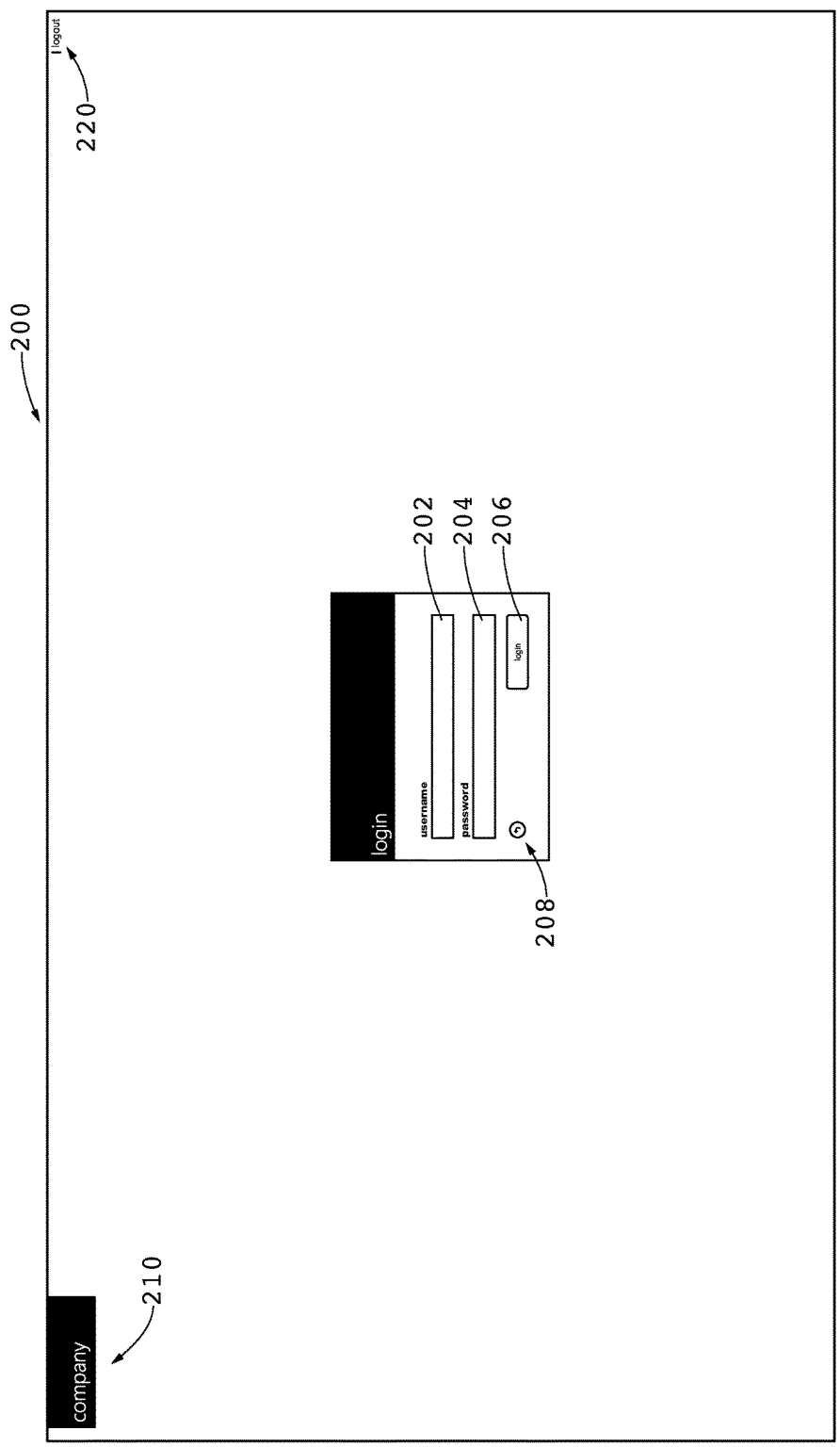
FIG. 2 shows an exemplary login screen.

A system user interface is provided to access the various features of the system. The system is accessed through a login screen 200 as shown in FIG. 2. This first screen allows the individual user to log into their personalized application space. As is common, the log in screen contains a data entry panel for entering a user name, as shown generally at 202, and a password, at 204. Clicking on or otherwise activating the login button 206 launches an authentication process that allows the user access to the system, and returns the system user to the user's personally selected data configuration. The login screen may be optionally provided with additional activation option buttons, such as button 208. Typically, this screen will also provide a title panel, as shown at 210, and a log out button, as at 220, that reverses the action of an already logged in user to allow a different user to enter the system, or to exit the system securely.

Figure 3:
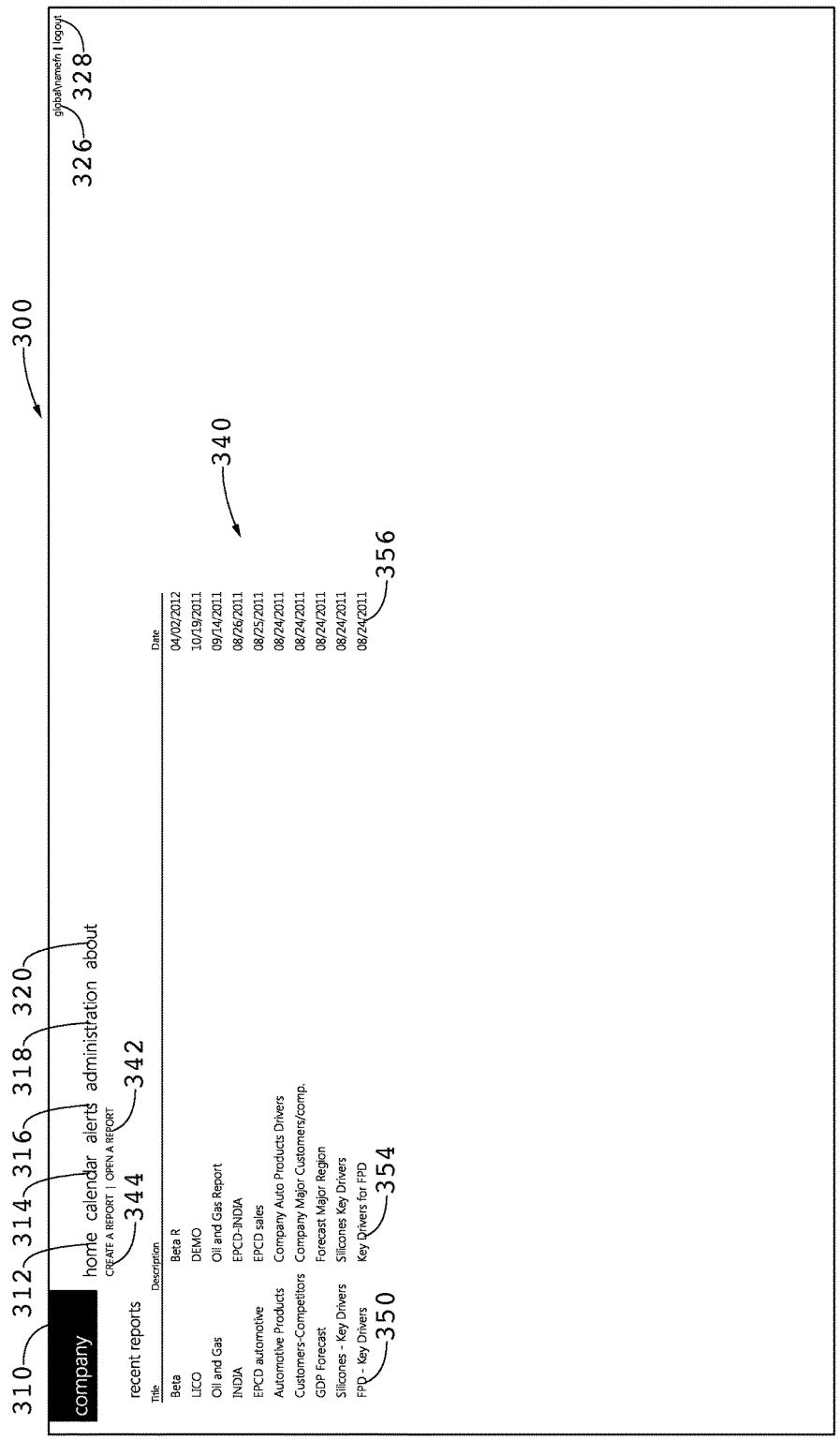
FIG. 3 shows a HOME screen displaying recent econometric reports created by a user.

Upon a successful login, the user is taken first to a "most recent reports" screen 300, as shown in FIG. 3, also referred to as the "home" screen. The system interface has several navigation buttons, as active links, displayed along the top portion of the screen that enable access to various functional components of the system application. A title block is provided at 310. The HOME button 312 links the user back to the most recent reports page. There are CALENDAR 314 and ALERT 316 buttons linking to a scheduling and alert system, respectively, said components of the system to be further discussed in the disclosure that follows. The calendar component allows system users to note or review when data is expected to be accessible to the system. The alerts component of the system allows the system user to direct the system to notify users when certain selected macroeconomic indicators are released, when new report updates are available, and when an indicator moves in a predefined manner, for instance. The ADMINISTRATION button 318 is linked to an administrative function that is used to create and administer user accounts, as well as other system setup and maintenance functions. The ABOUT button 320 links to additional information about the software. Also available are administrative identification functions, through link 326, and again a logout activation link 328.

As shown in FIG. 3, the home screen 300 is preferably configured to show a tabulated list of reports available for viewing, shown generally at 340. The recent reports table 340 is configurable to display a user-definable number of most recent reports that have been created, modified, or viewed by the user. Links are available from the home screen 300 to open a specific report at 342, or to create a new report at 344 using data available to the system. The recent report table/list 340 is configurable to display columns listing report titles 350, descriptions 354, and the date 356 on which the reports were created or last updated or accessed.

As described below, the system provides an online database that has economic, demographic, and statistical data for interfacing to a customer database. The customer database is interfaced to internal financial systems to collects company data for comparison and analysis.

The presently disclosed system allows system users to display and to align multiple data series in a software based chart by interacting with the chart and moving or aligning a displayed data series in different directions (i.e., right or left, or forward or backward in the time domain interval). In general, the system provides for a modifiable graphical display of economic data diagrams, and provides steps allowing the user to interact with a software-based chart to adjust series axes. The graphical display provides for a software-based chart with the components including a first data series chart, and a second data series for charting, with a primary chart axis and a secondary vertical axis and horizontal axis. Selection of a chart area allows the user to activate a user control for moving data series. As an example, moving the axis to the left triggers a bar indicator showing the direction of the intervals of the data series' relative dislocation. Thus provided are user controls for displaying a first data series and a second data series, a vertical primary axis, a horizontal primary axis, and secondary vertical and horizontal axes. As the user manipulates the display controls to move data series relative to one another, the display shows the shifted data series, an arrow indicating the direction of movement and interval or magnitude of change.

The various components of the system connect and interact as follows: when the system user mouses over a software-based chart, a user control appears at the bottom of the chart. The user then drags the user control to the right and one of the data series move in that direction. An arrow indicating the direction of data series movement and periodic interval change appears along the upper border of the chart. The user can also move the user control to the right of the display, and the data series will similarly move in that direction. In this case the arrow at the upper border of the chart likewise indicates the direction of travel and interval of the changed amount. In general operation, the system user would launch the software program and see a table listing the charts available. The user would use a computer input device (i.e., a mouse) to select and interact with the charts. Alternatively, the charts can be formatted for proper display, such as for style (line, bar, column width) and for selection of data series to be analyzed, along with the temporal intervals value. Additionally, the direction of data series travel can be displayed in any direction, i.e. chronological, or reverse chronological order. Thus, the look and feel of the chart display and the user controls available can be customized based on the individual user preferences.

Figure 4:
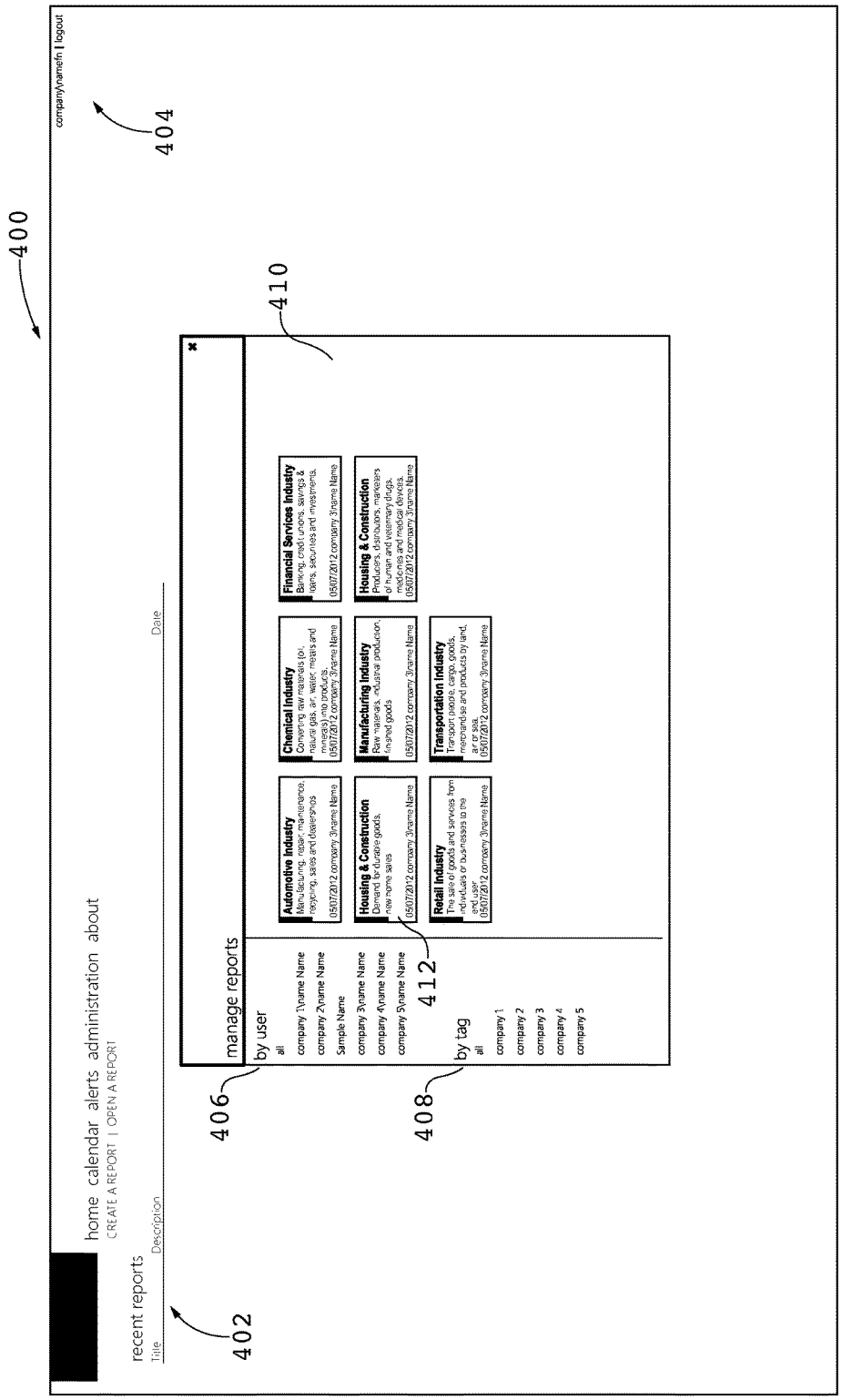
FIG. 4 shows a manage reports screen wherein a user may sort, search, and access econometric data reports stored in the system.
Figure 5:
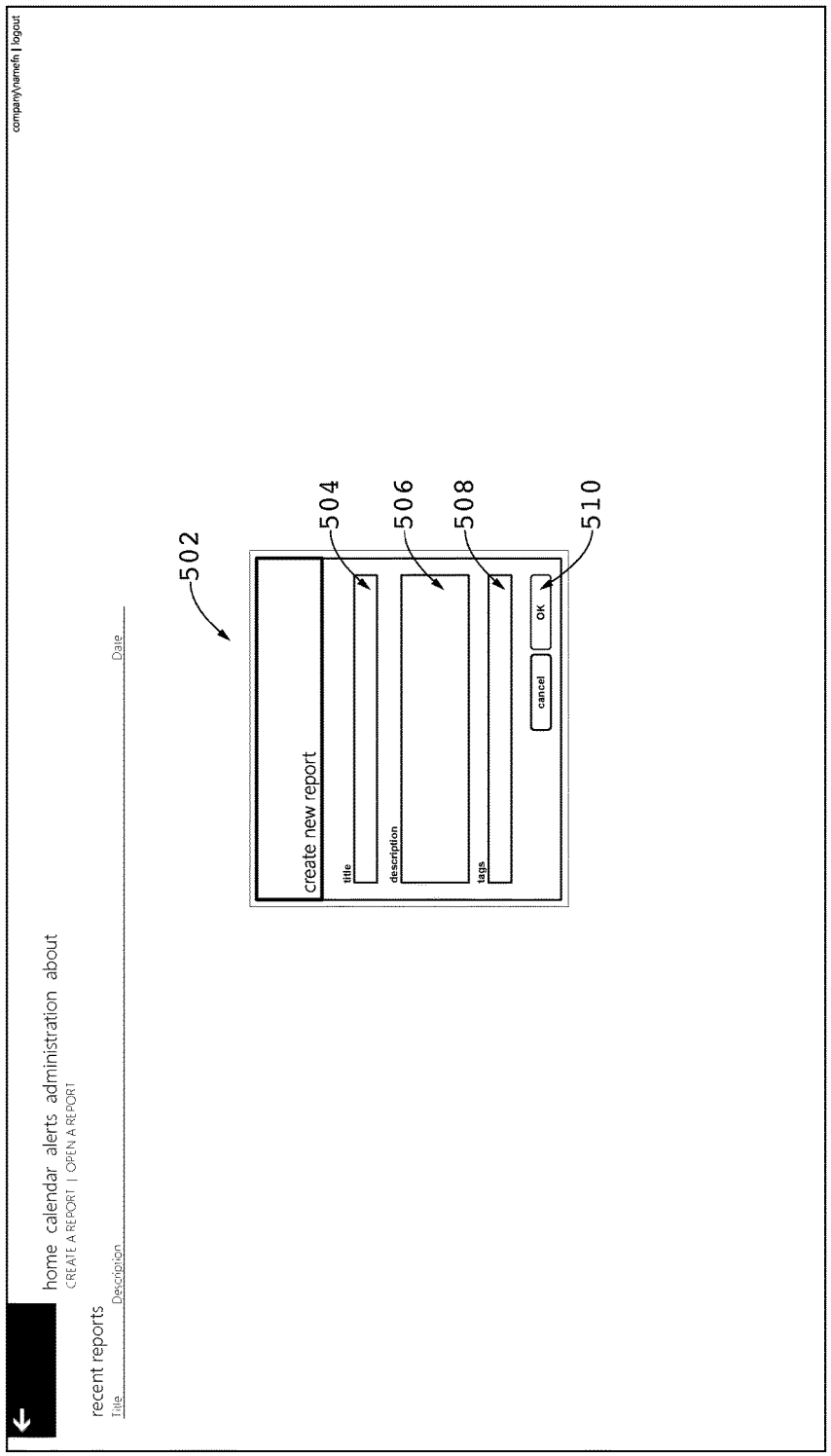
FIG. 5 shows a create report screen used for creating econometric reports.

To first review the entire set of saved econometric reports available to a user after logging into the system, the "open a report" button 342 is selected from the home screen 300 in FIG. 3. The user is presented with a manage reports box, as shown at screen 400 in FIG. 4. The box displays in front of the recent reports list 402 (shown here unpopulated for a new user). User information and logout controls are presented at 404. The open a report screen 400 allows a user to filter the available reports by the user that created the report, as at 406, or by keyword tag 408 entered when the report is created. Other such filtering characteristics can be applied to more easily manage large amounts of econometric reports. The individually saved reports themselves are shown in the report list window 410. For example, the report "Housing & Construction" 412 appears in the list, including a list of tags, creation date, and user who created the report. Selecting the desired report will open the report into the dashboard view, explained in connection with FIGS. 5-14.

To create a new report, the user chooses the "create a report" link 344 from the home screen 300. After choosing to create a new report, a pop up box 502 appears as in FIG. 5. The user is prompted to enter a report title in text box 504, a report description in text box 506, and searchable keyword tags (e.g., "sales," "cost of goods sold," etc.) in text box 508. Choosing "OK" button 510 will create an instance of the created report and lead the user to the "select metrics" step, shown in FIG. 6 at screen 602. At this step in report creation, the set of desired econometric data series to appear on the report for further detailed analyses is chosen. After selecting the desired econometric data series and pressing the "SAVE" button 604, the application server 115 (FIG. 1) requests the corresponding data from the metric database 120 via 118.

Figure 6:
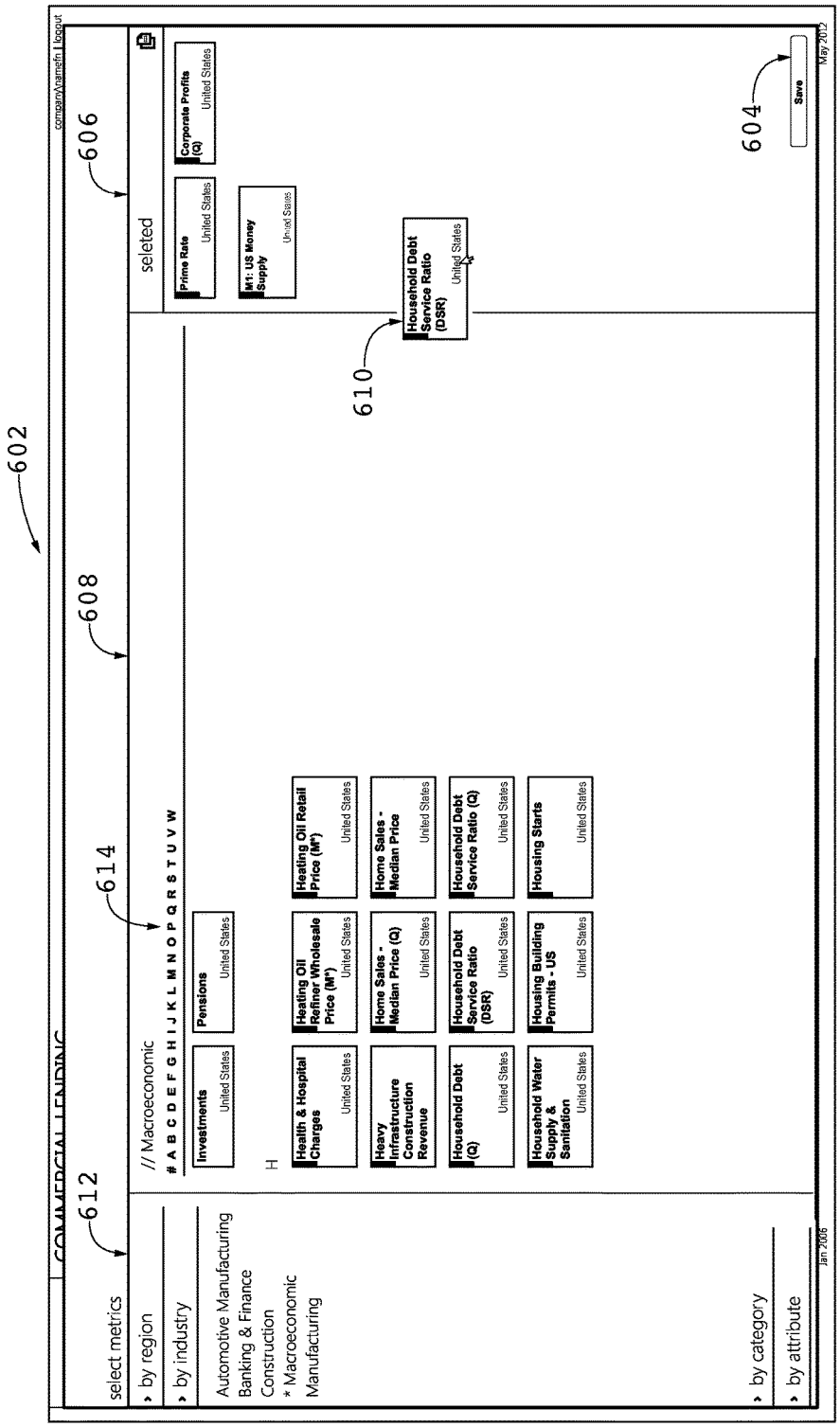
FIG. 6 shows a selection screen for selecting or editing the econometric data sets that are to appear in an econometric report.
Figure 7:
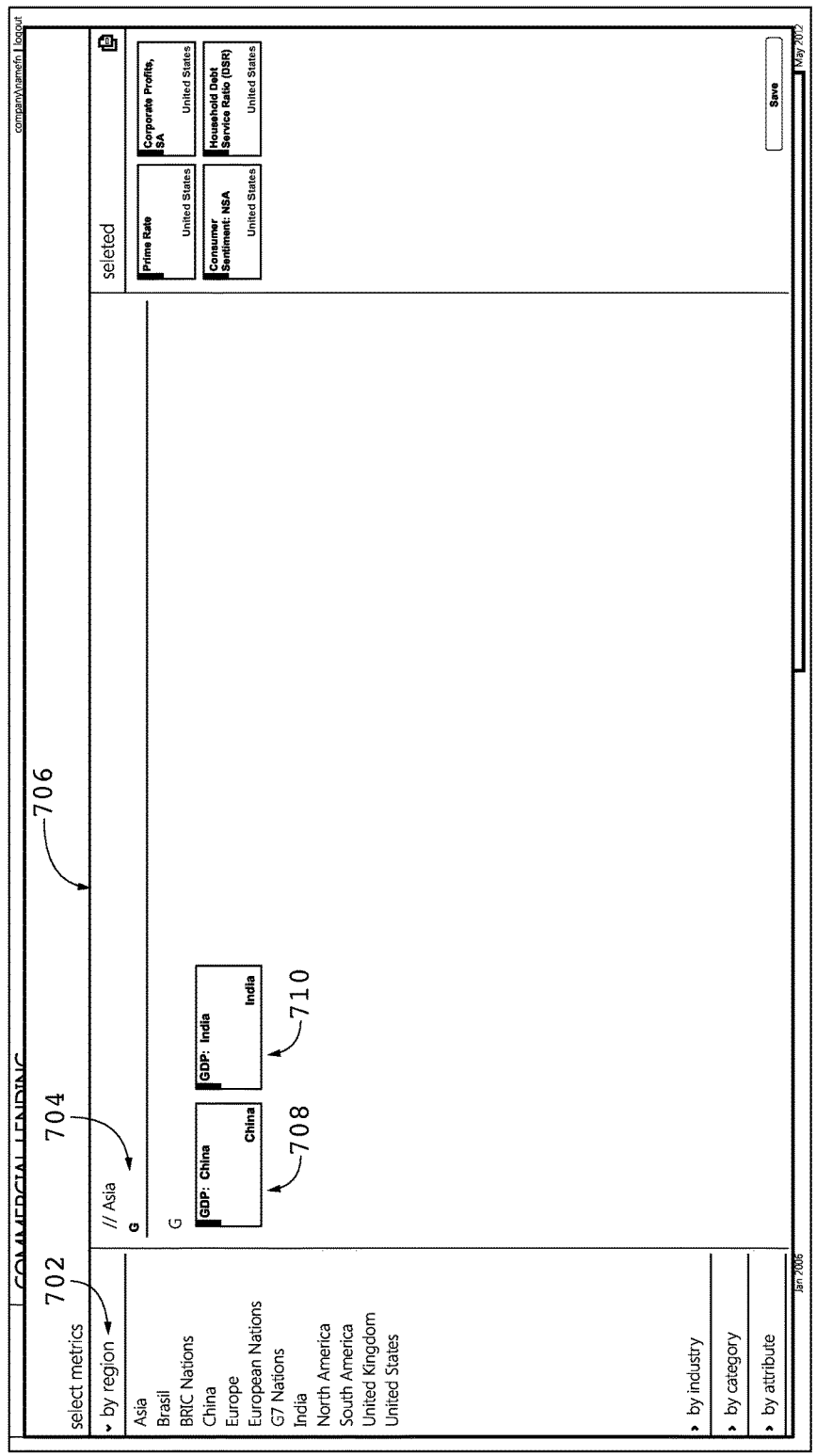
FIG. 7 shows a second view of the selection screen shown in FIG. 6.

The one or more macroeconomic data series chosen for the report will appear in the "selected" portion 606 of the screen 602. Individual econometric data series are represented on the screen, as at 610, and are listed in the metric list portion 608 of the page. A categorization interface 612 allows econometric data series to be sorted and filtered by certain characteristics of the data series, for instance, by region, industry, category, attribute, or the like. FIG. 6 shows, for instance, the data series sorted according to industry, with the macroeconomic data series selected from the selected portion 606. Those metrics starting with the letter "H" have been selected via alphabetic filter 614, revealing econometric data series that have been loaded into the metric database 120 (FIG. 1) such as, for example, "Health and Hospital Charges," Home Sales—Median Price," and "Household Debt." FIG. 7 depicts the metrics filtered by region where the selected portion 706 indicates that "Asia" is the selected filter. The data series for "GDP: China" 708 and "GDP: India" 710 are available for addition to the report, if so desired.

When a desired metric is located for use in the report, the data series can be added by clicking the data series, or it may be drug from the metric list portion 608 to the selected portion 606 of the screen, as at 610. Choosing the "SAVE" button 604 after the desired metrics have been selected will save the chosen metrics and return the user to the report dashboard, as in FIG. 8.

Figure 8:
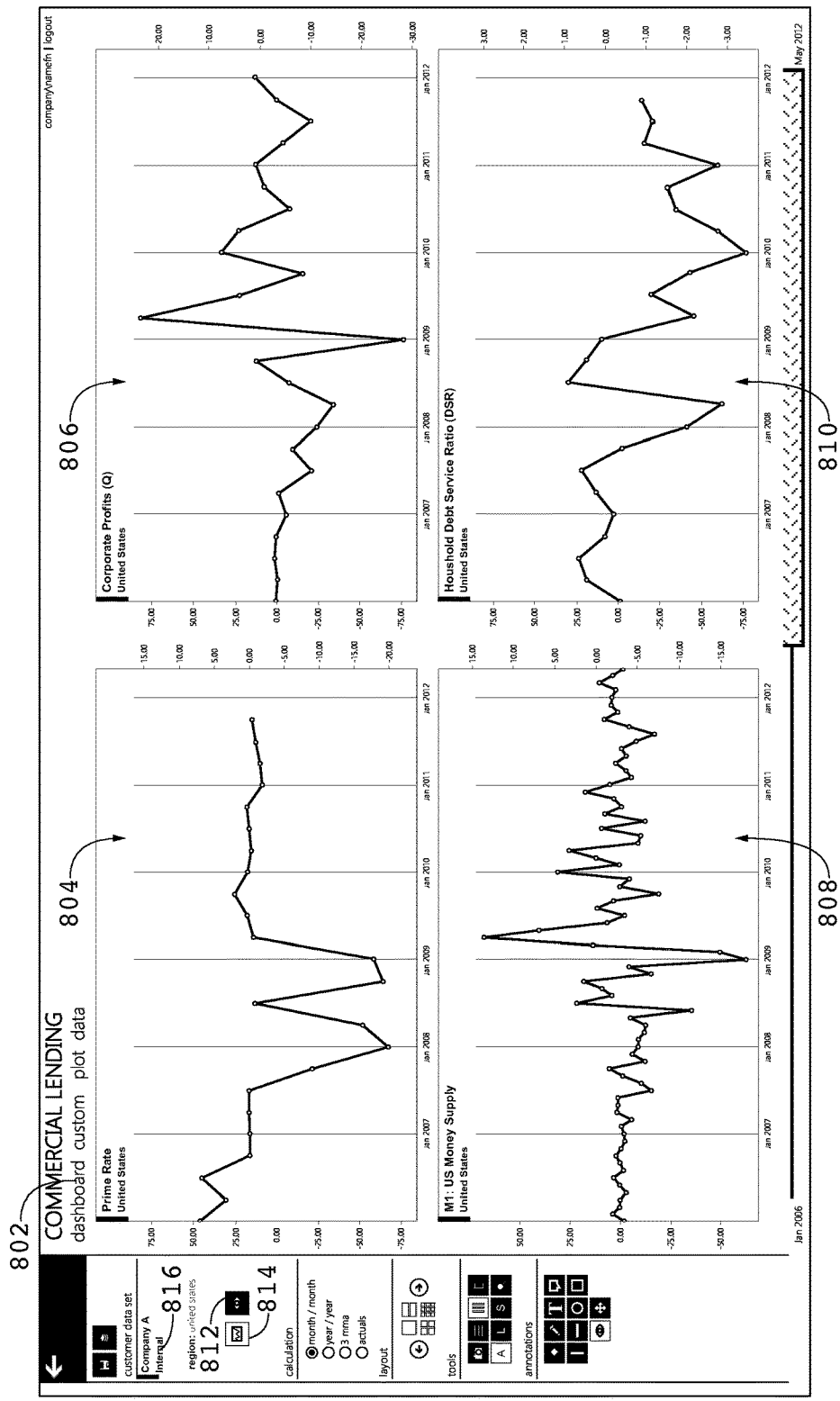
FIG. 8 shows an exemplary econometric report.

FIG. 8 is an example of a report dashboard, also accessible in the report manipulation view by selecting the "dashboard" menu choice 802. As four economic data series were chosen in the "select metric" step shown in connection with FIG. 6, the report is populated with four charts or graphs, 804, 806, 808, and 810. Each chart corresponds to one of the four selected data series. Show/hide button 812 can be used to show or hide the base, or target, metric. The target metric is the econometric data series against which the potential indicator metrics are measured and analyzed. The target metric will often be an internal business metric, but can also readily be other external macroeconomic metrics as well.

The target metric is chosen by selecting the target metric selection button 814, which presents the user with the ability to select the target metric in the same manner in which the indicator metrics were selected in connection with FIG. 6. In the instant example the target metric has been set to "Company A Internal" as displayed in the target metric label 816, which could be, for instance, Company A's stock price, sales volume for a particular product line, or other similar target metric. Clicking the show/hide button 812 will display the target metric overlaid with the indicator metrics in each of the charts 804, 806, 808, and 810.

Figure 9:
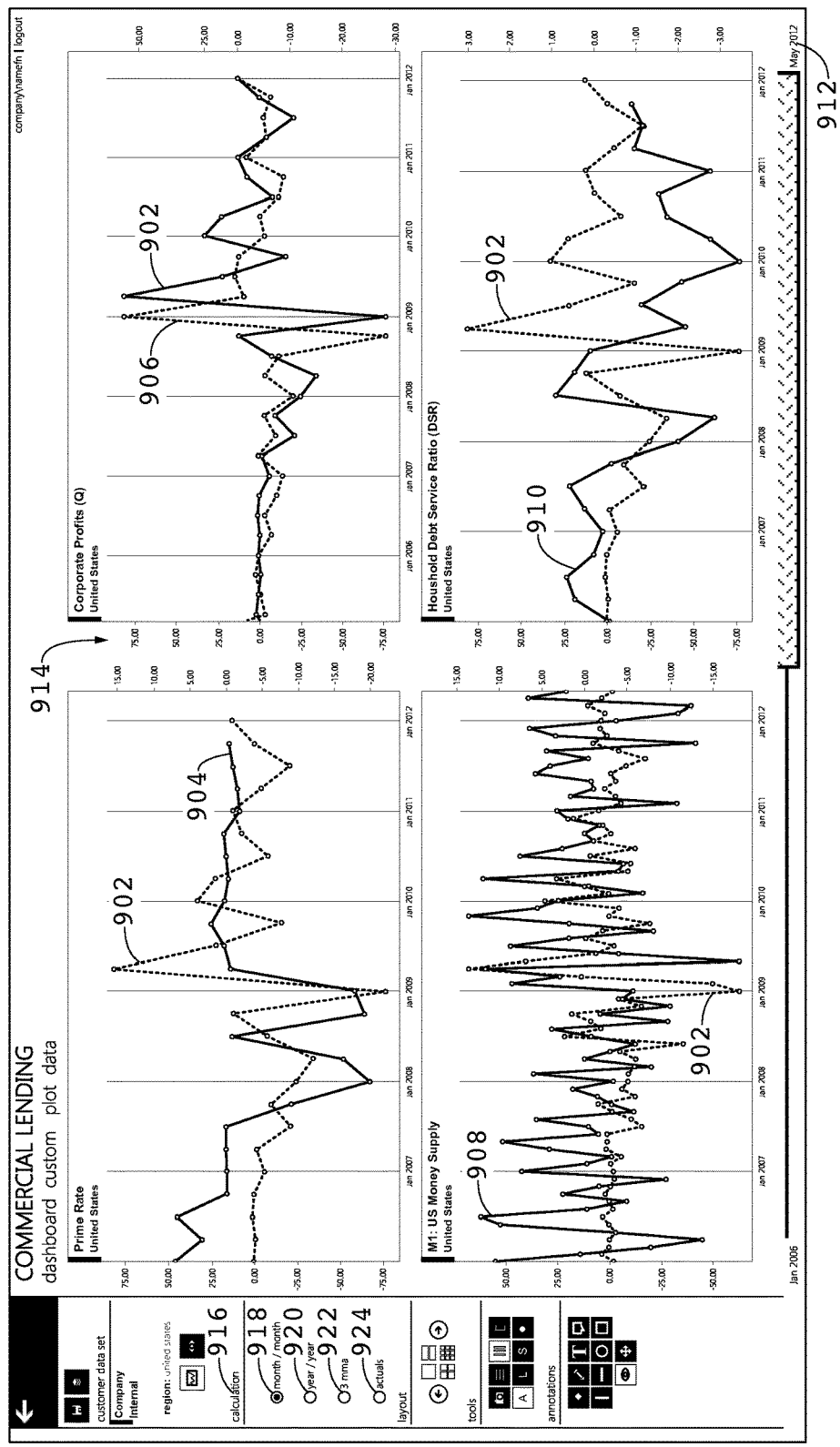
FIG. 9 shows the exemplary econometric report of FIG. 8 with a target metric plotted on the charts.

FIG. 9 shows each of the four chosen indicator metrics, "Prime Rate 904," "Corporate Profits 906," "M1: US Money Supply 908," and "Household Debt Service Ratio (DSR) 910" against the target metric "Company A Internal" 902 for the time domain between January 2006 and early 2012. The chart axes can be labeled, for instance, with the applicable time domain labels and corresponding y-values, as at 912 and 914, respectively. The y-values for any given metric are taken from primary source data sets and can be actual values. For the Prime Rate 904 metric, the actual values would be, for example, the prime interest rate at a given time. The system and methods disclosed herein are used to derive other useful statistical data sets based upon the primary source actuals, and prepares and stores them for use when creating a report and analyzing the relationship amongst metrics. By performing statistical checks, error checking, and formatting the incoming econometric data, significant time savings are achieved over the usual method of importing raw data from external sources and analyzing and preparing it for further comparison with target metrics.

Figure 10:
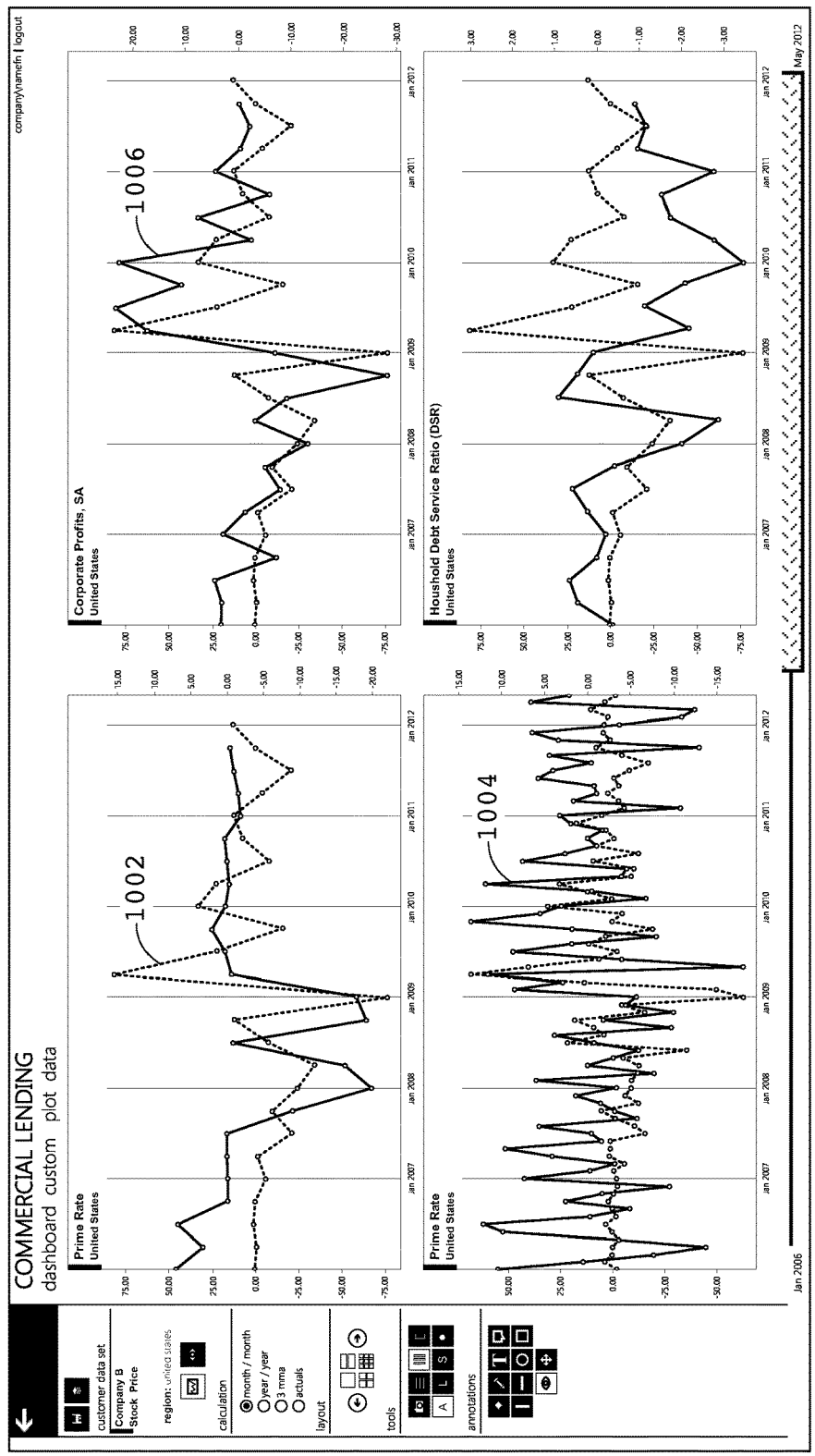
FIG. 10 shows a second exemplary report with varying econometric data series selected with respect to FIG. 8.

The "calculation" module 916 contains options for displaying the metrics in these several statistical forms by giving the use the option to view the data in a month-over-month percent change format 918 (the format shown in FIG. 9), a year-over-year percent change 920, a three-month moving average 922, or actual values 924. The system also populates statistical permutations for econometric data sets that may have a larger time period between data points than the calculation mode chosen by the user through the calculation module 916. For example, FIG. 9 depicts three indicator metrics (Prime Rate 904, Corporate Profits 906, and Household Debt Service Ratio (DSR) 910) that are reported quarterly. Although the month-over-month calculation mode is selected in this particular report, the three quarterly-reported metrics are shown in a statistical permutation that is actual quarter-over-quarter percent change. The system automatically calculates the minimal time period for econometric data sets that are reported on a less frequent basis than the desired calculation mode. The M1: US Money Supply 908 indicator metric is reported monthly, and therefore is displayed in FIG. 9 with real month-over-month percent change values. An alternate report is shown in FIG. 10 having two different indicator metrics chosen, "Prime Rate" 1004 and "Corporate Profits, SA" 1006, shown against the target metric "Company B Stock Price" 1002.

Figure 11:
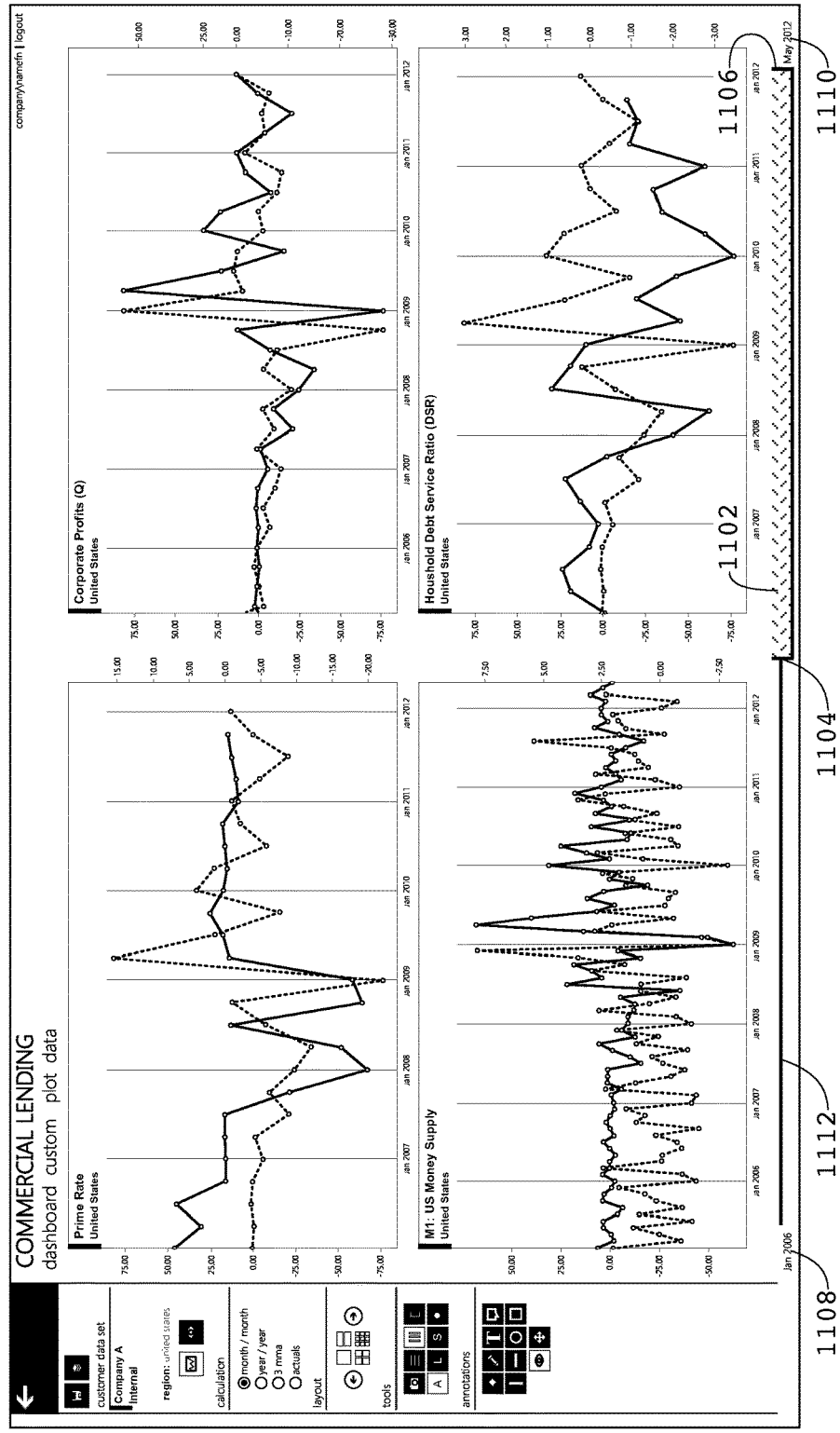
FIG. 11 shows a third view of the report shown in FIG. 8 with altered time domains.

Turning to FIG. 11, the functionality provided in the time domain defining control 1102 is illustrated. The time domain defining control 1102 has one or more time domain outer bound drag bars, as at 1104 and 1106. The time domain defining control 1102, lower bound drag bar 1104, and upper bound drag bar 1106 may each be graphically manipulated by the user. Moving either drag bar, or the control itself, will alter and redefine the time domain in which the selected metrics for a report are displayed. The example report shown in FIG. 11 is grounded in the same data set as shown in connection with FIG. 9. Comparing the two instances demonstrates that FIG. 9 displays all five metrics for the time period starting January 2006 and ending May 2012. In FIG. 11, the lower bound drag bar 1104 has been slid to the left by the user, expanding the time domain and thus the range of available data viewed in the report dashboard. The metrics are now displayed for the time period starting in March 2005 and ending in May 2012. The outer bounds for the time domain in a given report are displayed in the lower bound display 1108 and upper bound display 1110 regions. Note that the entire time domain defining control 1102 may be graphically manipulated along line 1112 (representing the available range of data), thereby maintaining the same range, or length, of data represented, while shifting the lower 1104 and outer 1106 bounds drag bars in unison.

As previously discussed, determining whether an indicator relationship exists between two econometric data series, as well as the nature and characteristics of such a relationship, if found, can be a very valuable economic tool. Armed with the knowledge, for example, that certain macroeconomic metrics are predictors of future internal metrics, business leaders can adjust internal processes and goals to increase productivity, profitability, and predictability. One aspect of the current system and methods provides users with the ability to graphically search for an indicator relationship between two metrics, and to explore the nature of that relationship.

A user will typically begin with a report similar to that shown in connection with FIG. 9, having multiple indicator metrics and a target metric. The ability to quickly visualize the multiple statistical relationships between any given indicator metric and the target metric, the user can quickly narrow the field of possible indicator metrics for the target metric. The charts shown in FIG. 9 shown that the macroeconomic data series Corporate Profits 906 most closely resembles the month-over-month percent change of Company A's internal metric 902. The chart area depicting the two overlaid metrics can quickly be expanded for further detailed analysis or a separate report restricted to the two metrics can be created.

Figure 12:
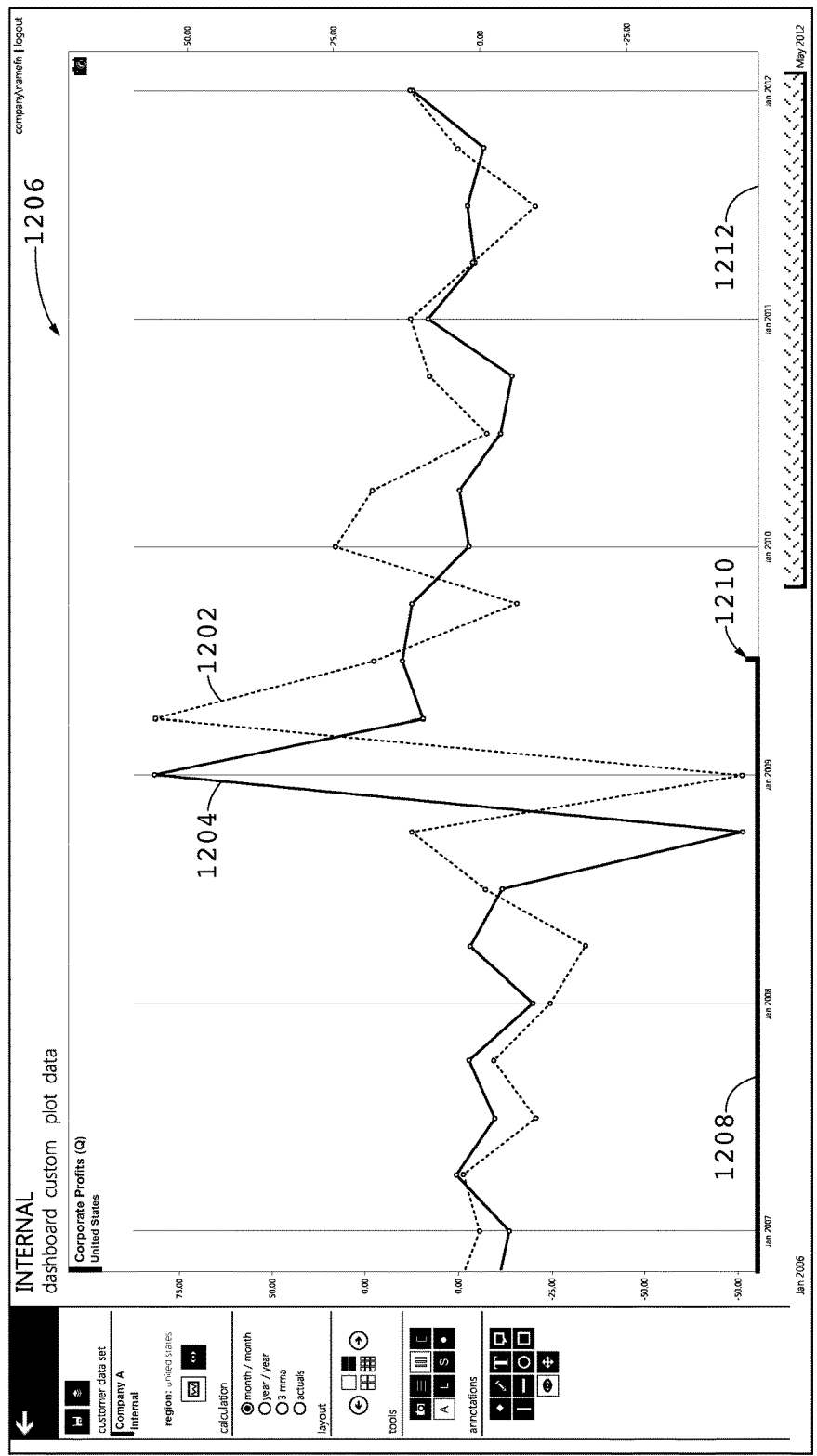
FIGS. 12-14 show various charts demonstrating the use of the system's time domain shifting function to identify indicator relationships between metrics.
Figure 13:
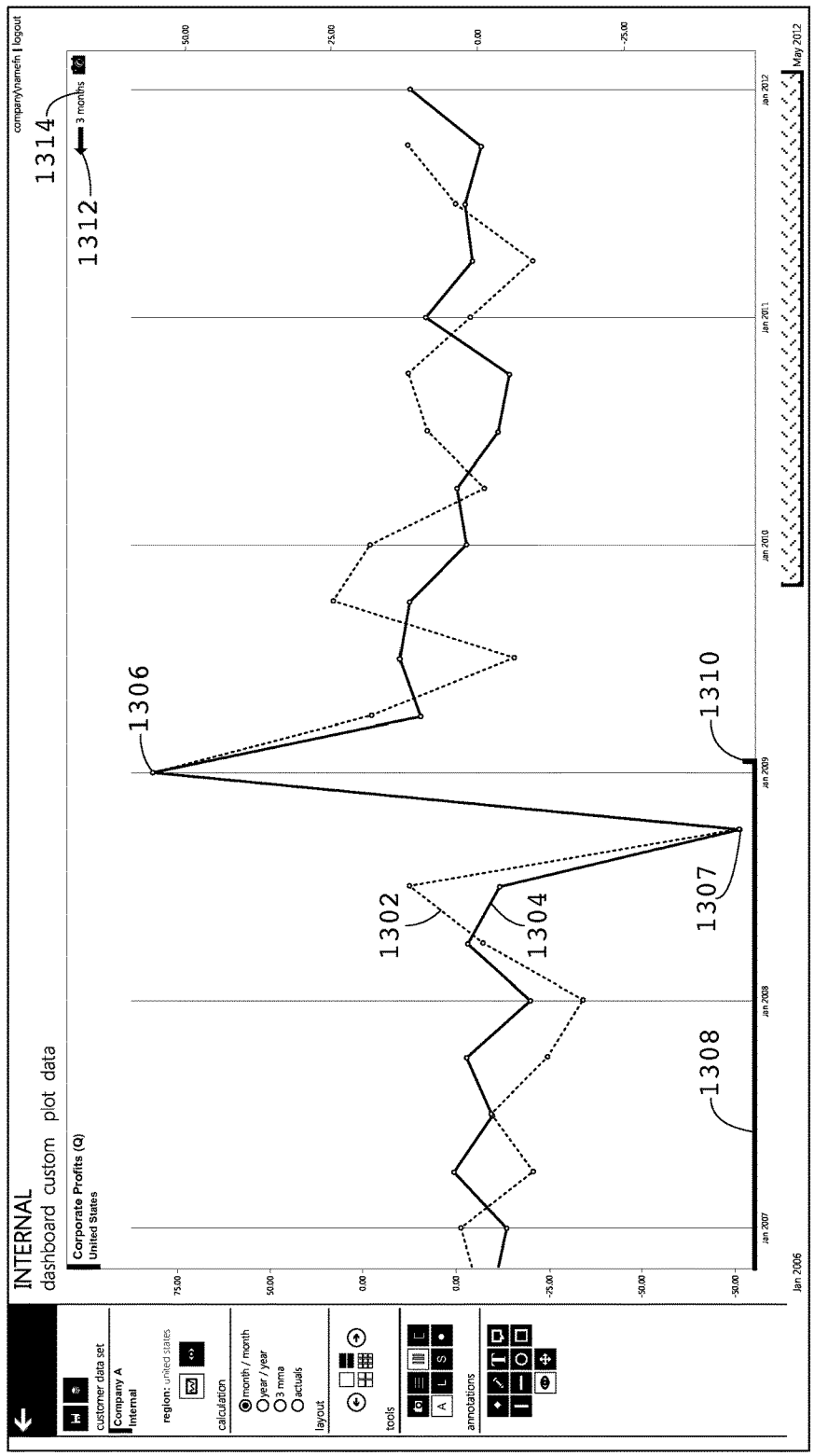

FIGS. 12-13 demonstrate the graphical analysis that the disclosed system and methods enable users to conduct. In FIG. 12, the chart showing the Corporate Profits metric 1204 and the Company A Internal metric 1202 has been expanded to fill the charting area 1206 in the reports dashboard. A time domain shifting control 1208 appears at the bottom of the chart area generally coincident with the time domain axis 1212. An engagement point 1210 is generally provided for the user to click and drag. Dragging the engagement point 1210 on the time domain shifting control 1208 will shift or transpose the target metric's time domain in the direction and relative magnitude of the drag. In FIG. 12, clicking the engagement point 1210 and dragging to the left will shift the entire internal data series 1202 to the left. The main advantage of enabling users to graphically examine econometric data series for indicator relationships is that the user can readily and quickly attempt to align the inflection points in the two data series as closely as possible.

Aligning the inflections points for the chart as shown in FIG. 12 yields the shifted results shown in FIG. 13. As is readily apparent to those skilled in the art, the ease with which a user can determine the existence of these types of relationships is an advantage. The peaks and valleys have been aligned roughly, as at 1306 and 1307. The software calculates and displays a shift direction 1312 and shift magnitude 1314. Here, the chart shows that the corporate profits macroeconomic metric 1304 leads Company A's Internal metric 1302 by approximately three months. The time domain shifting control 1308 has had its engagement point 1310 shifted to the left, thereby shifting the internal metric 1302 as if it had occurred three months prior to the actual data.

Figure 14:
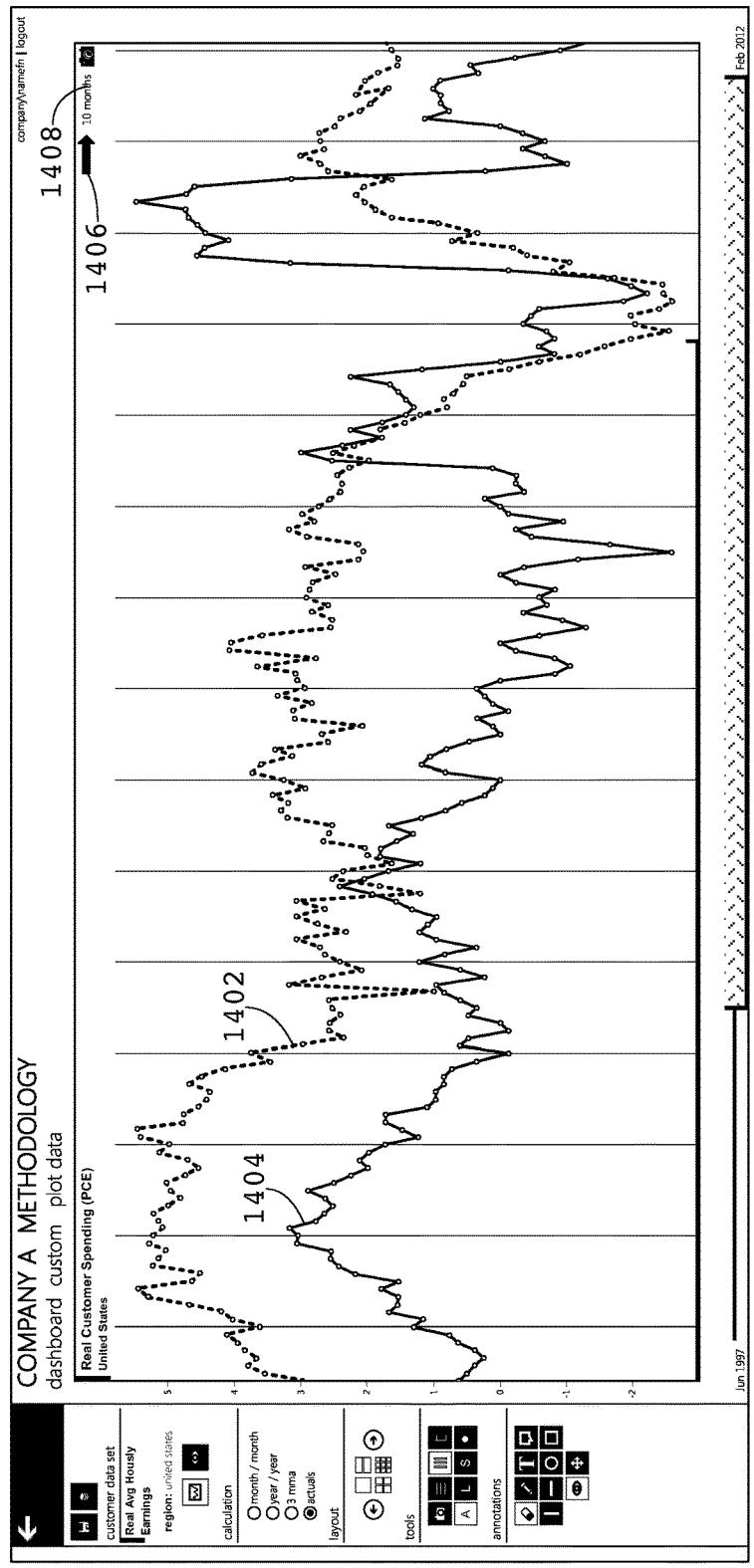

FIG. 14 is a second example of the methodology being employed to determine a leading, coincident, or lagging indicator relationship between two chosen metrics. Here, the United States real consumer spending 1404 metric is compared against United States real average hourly earnings 1402. This is an example of two macroeconomic metrics being analyzed and compared against each other. In some instances, this technique is useful for daisy-chaining indicator relationship amongst several macroeconomic metrics in order to determine a true and highly correlative leading indicator for an internal metric, for example.

The chart shown in FIG. 14 demonstrates that real average hourly earnings 1402 leads real consumer spending 1404 by approximately ten months as shown by the shift direction display 1406 and shift magnitude display 1408. The divergent period in the middle of the data can be explained as a consequence of a tax break that affected real consumer spending for a relatively short period of time after which the pattern continued. After identifying a promising leading indicator for a given internal metric, the relationship between the promising leading indicator and various external metrics can be explored to determine if there is an underlying external metric that better predicts the movement of the internal metric.

Figure 15:
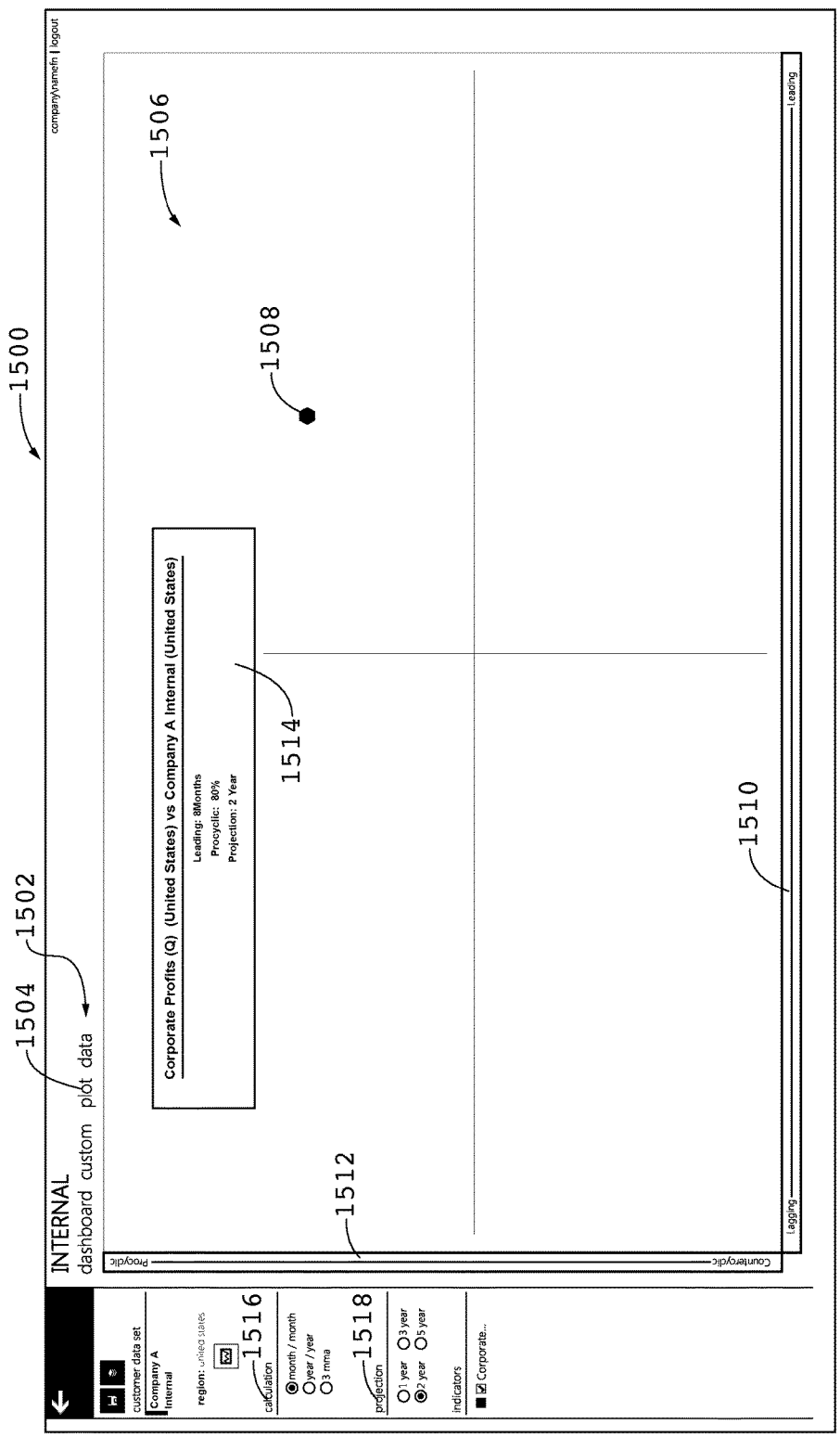
FIGS. 15-16 show exemplary instances of charts produced through the use of the system plotting function to identify indicator relationships between metrics.
Figure 16:
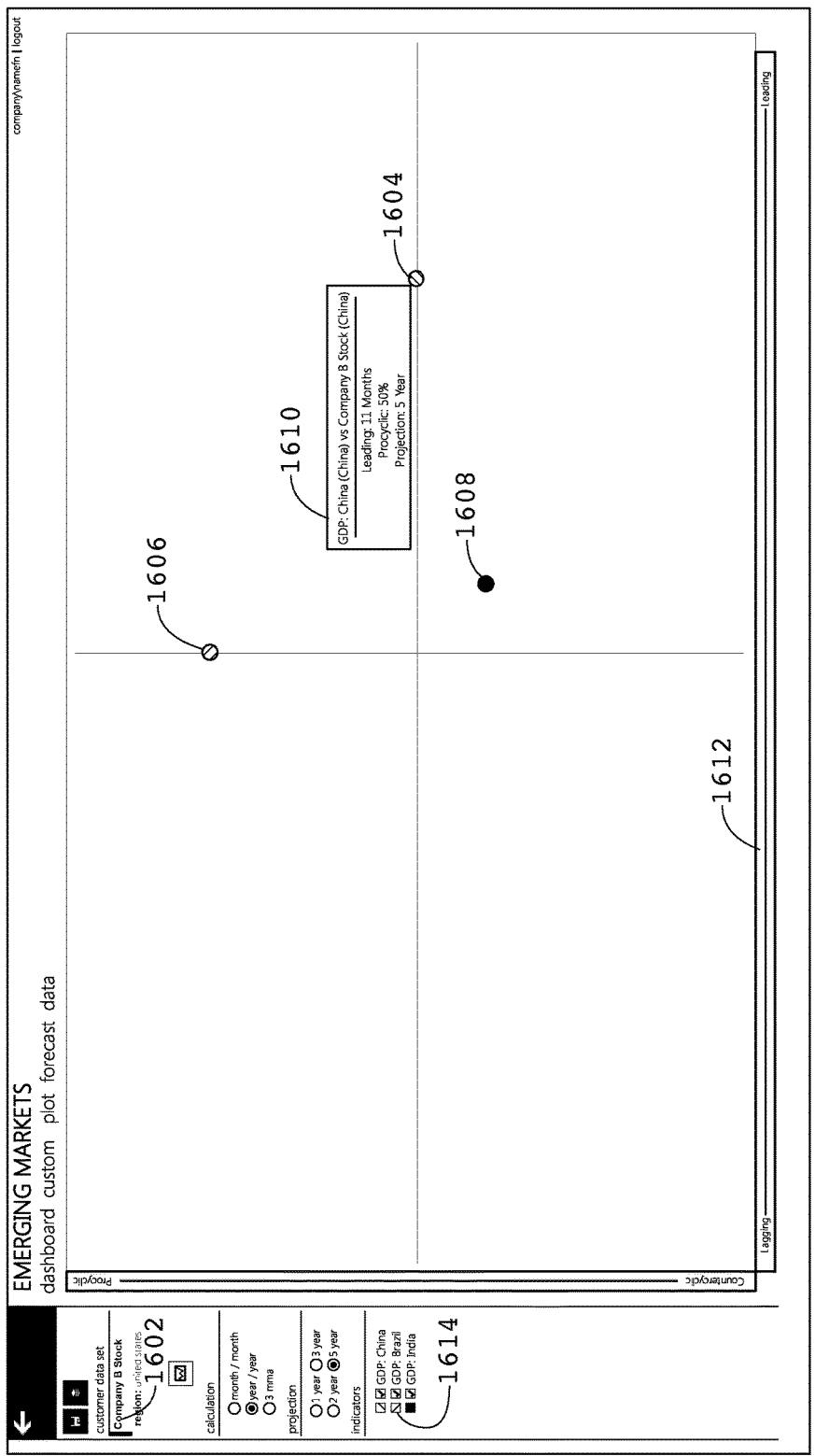

A further aspect of the present system and methods is disclosed in connection with FIGS. 15-16. These figures show the use of the software's plotting functionality. The plot screen 1500 is reached by selecting the "PLOT" menu item 1504 from the report menu bar 1502. The plot screen 1500 incorporates further statistical manipulation and analyses of the selected external and internal metrics. FIG. 15 shows the use of the plot functionality on the metrics chosen in connection with FIGS. 12-13, namely, corporate profits and Company A's Internal metric. The plotting function renders a quadrant chart 1506 and data points therein, as at 1508. The data points are plotted relative to an indicator axis 1510 and a cyclic axis 1512. The software performs the appropriate statistical functions and compares various time domains for each indicator metric against the target metric chosen for the particular report. As a result, the plotting function is able to render a data point for each indicator metric relative to the target metric with regard to whether the indicator metric leads, lags behind, or changes coincidentally with, the target metric, plotted horizontally along the indicator axis 1510.

The plotting function also renders the data point along the cyclic axis 1512. The cyclic axis 1512 is used to graphically display the cyclical nature of the relationship between the two metrics, as well as the statistical confidence or tendency shown toward a particular cyclical relationship—i.e., procyclic, acyclic, or counter-cyclic. Indicators exhibiting strong procyclic behaviors experience trends in the same direction as the target metric. Counter-cyclic behaviors are exhibited by indicators that experience movement in the opposite direction of the target metric. Acyclic indicators both procyclic and acyclic behaviors in approximately similar quantities, making it difficult to predict the movement of the target indicator.

The plotting function also can display tabular data in a tabular data box, as at 1514. The two metrics shown in connection with FIG. 15 exhibit an eight-month leading/lagging period that is 80% procyclic over a two-year period, as outlined in tabular data box 1514. The calculation module 1516 allows the user to analyze the relationship between the two metrics on a month-over-month percent change, year-over-year percentage change, or three-month moving average basis, thereby determining the precise nature of the relationship. The projection module 1518 likewise allows the user to specify the time period over which to analyze the two metrics. The particular projection choices shown in the module 1518 will vary from comparison to comparison based on the relevancy of the correlation between the metrics. In this particular example, the user has the option of calculating the leading/lagging and cyclical characteristics over one-, two-, three-, and five-year time periods.

Another example of the plotting functionality is illustrated in FIG. 16. In this example, the metric Company B Stock 1602 is being analyzed for leading/lagging indicators present in external emerging market metrics (note the report title as well, in title space 1603). The internal metric is analyzed against the external metrics GDP: China plotted as data point 1604, GDP: Brazil plotted as data point 1606, and GDP: India plotted as data point 1608. The software can be set up to display a tabular data box, as at 1610, when a user hovers the mouse pointer over a particular data point, for example, when more than one data points are present in the plotting chart. Here, the tabular data box reveals that China's GDP can be characterized as an 11 month leading indicator of Company B's stock price, but is acyclic (50% procyclic) and therefore is not a desirable predictor of the internal metric. India's GDP 1608 has counter-cyclic tendencies, but may also exhibit acyclic tendencies that make its use as a leading/lagging indicator nominal. Finally, Brazil's GDP 1606 is relatively useful in terms of its consist procyclic nature, but its position relative to the indicator axis 1612. Note also that the individually plotted data points can be shown or hidden by using the indicator show/hide check boxes at 1614.

Figure 17:
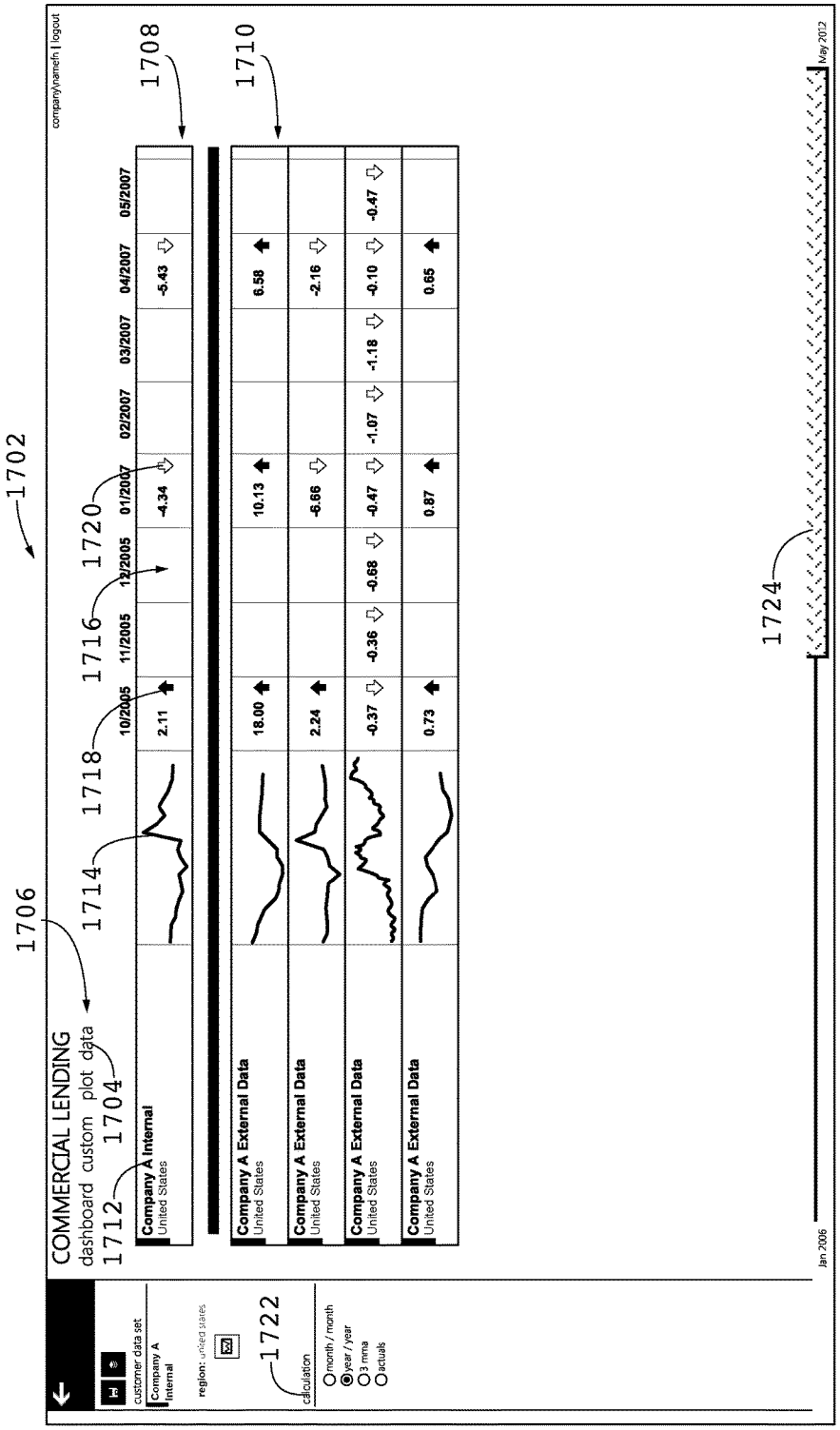
FIGS. 17-18 show exemplary instances of charts produced through the use of the system data function to identify indicator relationships between metrics.

Yet another aspect of the system and methods is illustrated in FIG. 17, which provides a further option for analyzing the indicator and cyclic nature of the relationships between metrics. The data function screen 1702 is accessed via the "DATA" menu item 1704 on the report menu bar 1706. The data functionality permits the user to tabularly and graphically view the metrics in the same visual space, providing yet another opportunity and viewpoint through which to analyze the metrics. The data tab 1702 presents the information for the target metric in a row, as at 1708. It also provides one or more rows corresponding to the number of indicator metrics being compared against the target metric, as at 1710.

The information presented on the data page 1702 contains a row 1712 identifying the particular metric to which the information in the remainder of the row corresponds. The following row 1714 contains a scaled graphical view of the data series. The remaining columns 1716 display the individual data points contained in the series, along with a graphical, colored representation of the movement over time, as at 1718 and 1720, for instance. Again, the data displayed may be viewed based on the various statistical and useful permutations as shown in the calculation module 1722. Presenting the data in an integrated graphical and tabular interface can greatly enhance the analysis of the metrics, and the ability to quickly compare metrics in such a manner greatly enhances the speed and productivity of a company's financial department employees. Note that the time shifting and defining controls 1724 are also available in the data view as well, allowing the user to view various discrete time domains.

Figure 18:
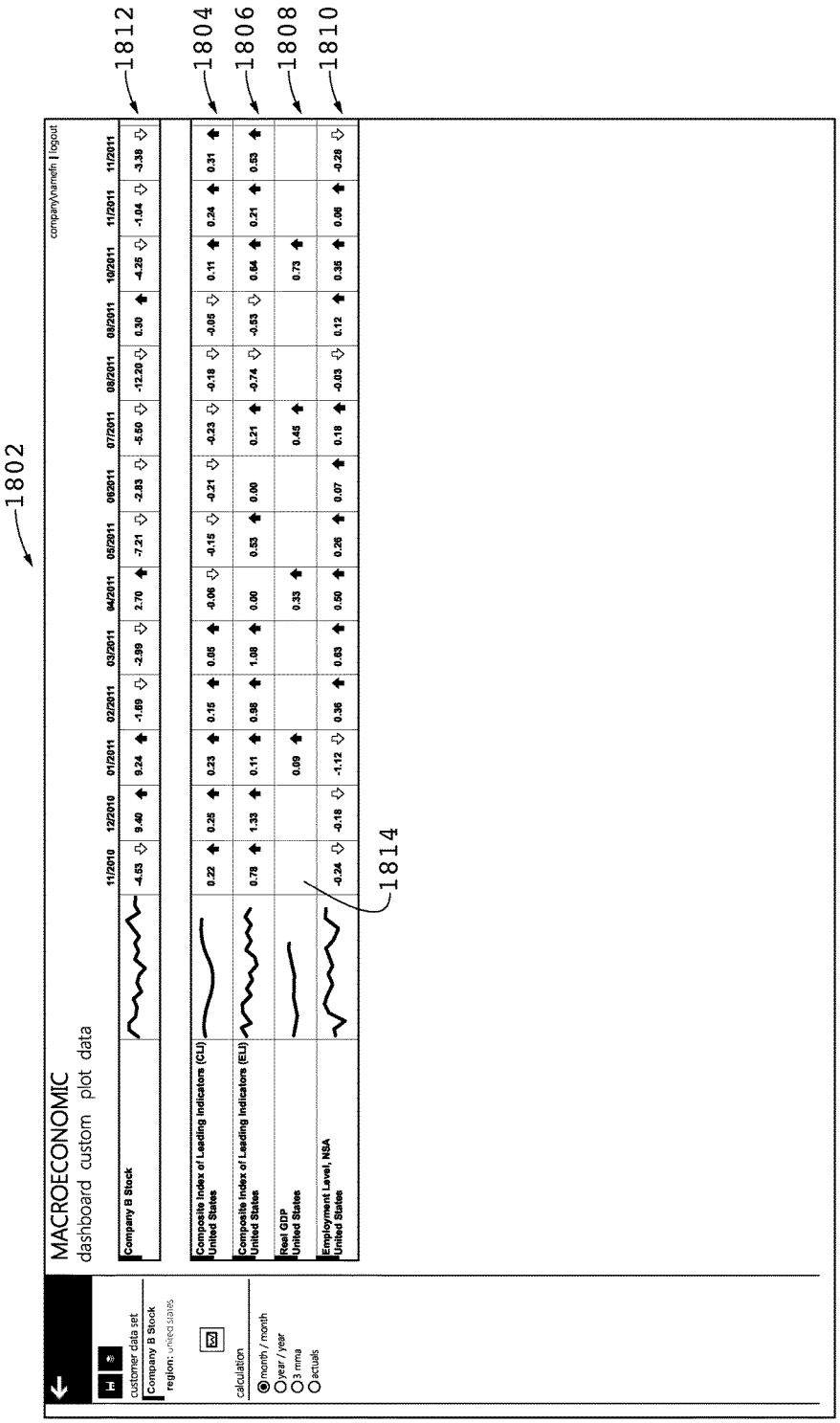

FIG. 18 displays yet another view of the data page at 1802 for the indicator metrics "Composite Index of Leading Indicators (CLI)" in row 1804, "Composite Index of Leading Indicators (ELI)" in row 1806, "Real GDP: United States" in row 1808, and "Employment Level, NSA" in row 1810. The target metric in this example is "Company B Stock" shown in row 1812. Note that the data page will contain a column for each data point in the most populated series (i.e., the metric with the shortest time between data points), and a blank in less-frequently reported or measured data series, as at 1814.

Much of the analyst work done in the corporate setting requires the user to create presentations or collaborate with other team members during the analysis process. While several software packages exist that include the ability to prepare presentable graphics and annotations to data results, the ability to make and capture useful graphical images can be cumbersome and time consuming, especially when factoring in the need to prepare the data and track the data sets. For example, a user might have a spreadsheet for each statistical permutation of a data set, a spreadsheet for each combination of metric data sets, and a spreadsheet for each graphical representation of a certain analysis component. The end result can be an unwieldy and cumbersome set of files to work with. The advantages of the integration of graphical presentation capabilities and annotation functionality directly with data series management and formatting will be readily apparent to those skilled in the art.

Figure 19:
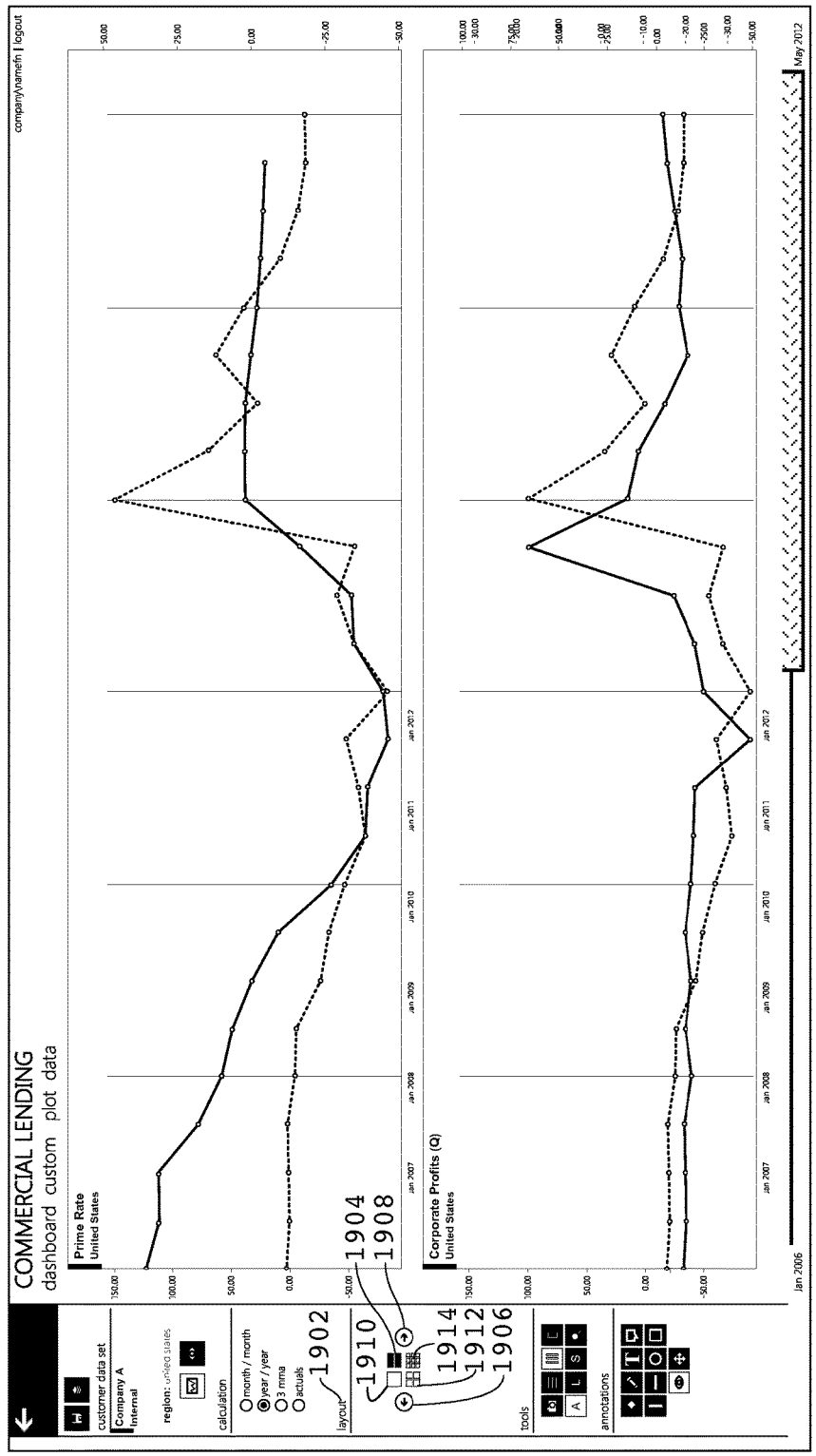
FIG. 19 shows examples of the report layout functionality of the system.

Turning back to the example report shown in connection with FIG. 9, FIG. 19 demonstrates the tiling capabilities shown in a report. The same four-chart report is shown in this figure. However, the layout module 1902 has been used to limit the charts shown on-screen to one column and two rows, by activating the two-vertical button 1904. The first two charts in the report in FIG. 9 thus appear here, as the United States Prime Rate chart 1903 and the United States Corporate Profits chart 1905. To view charts that become hidden upon activation of the two-vertical button 1904 (or any other configuration button), the user can scroll through the remaining charts two at a time by using the scroll buttons 1906 and 1908. Other buttons allow configurations such as one chart per view 1910, four charts per view in a two-by-two configuration 1912, and nine charts per view in a three-by-three configuration 1914. Other configurations can of course be used in a similar manner depending upon the particular needs of an application.

Figure 20:
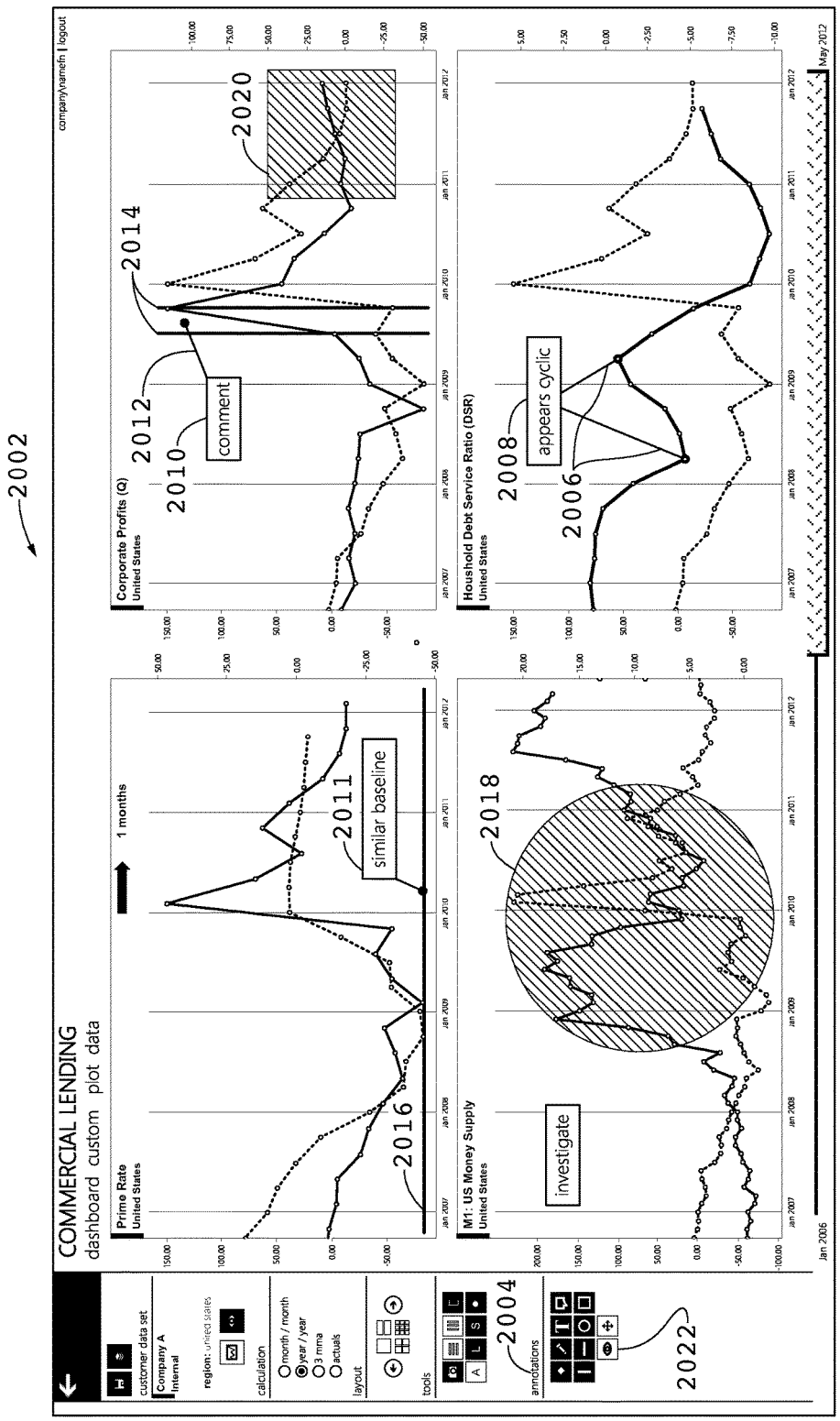
FIG. 20 shows exemplary uses of the report annotation features of the system.

Furthermore, FIG. 20 shows examples of the many annotation features that may be integrated directly with the data manipulation report interface 2002. The annotation module 2004 holds many feature buttons that allow a user to annotate the chart area in ways that can be used as highlights in presentations, reminders to the user, or as comments to colleagues, for example. The users can, for example, draw lines, as at 2006 for calling out certain features or to graphically estimate a trendline. A text box may also be added to provide comments, data points, background information, or notes for further analysis, for instance, as shown at 2008. Similarly, callout boxes, as at 2010 and 2011, can be used to place comments outside of feature areas to avoid clutter and difficult positioning in tight spaces, and have a trailing line leading to the desired spot on the chart area, as at 2012. Vertical 2014 and horizontal 2016 lines provide useful reference lines for noting trends between data points and curves, for example. Various shaped highlights can be provided for highlighted certain areas for presentation or further investigation purposes, such as those shown at 2018 and 2020. The highlights could be shaded areas or clear areas with the remainder of the chart darkened to focus the user or viewer's attention to the area. Finally, if annotations are not wanted during further development of a report, a show/hide annotations button 2022 can be provided for hiding the annotations.

Figure 21:
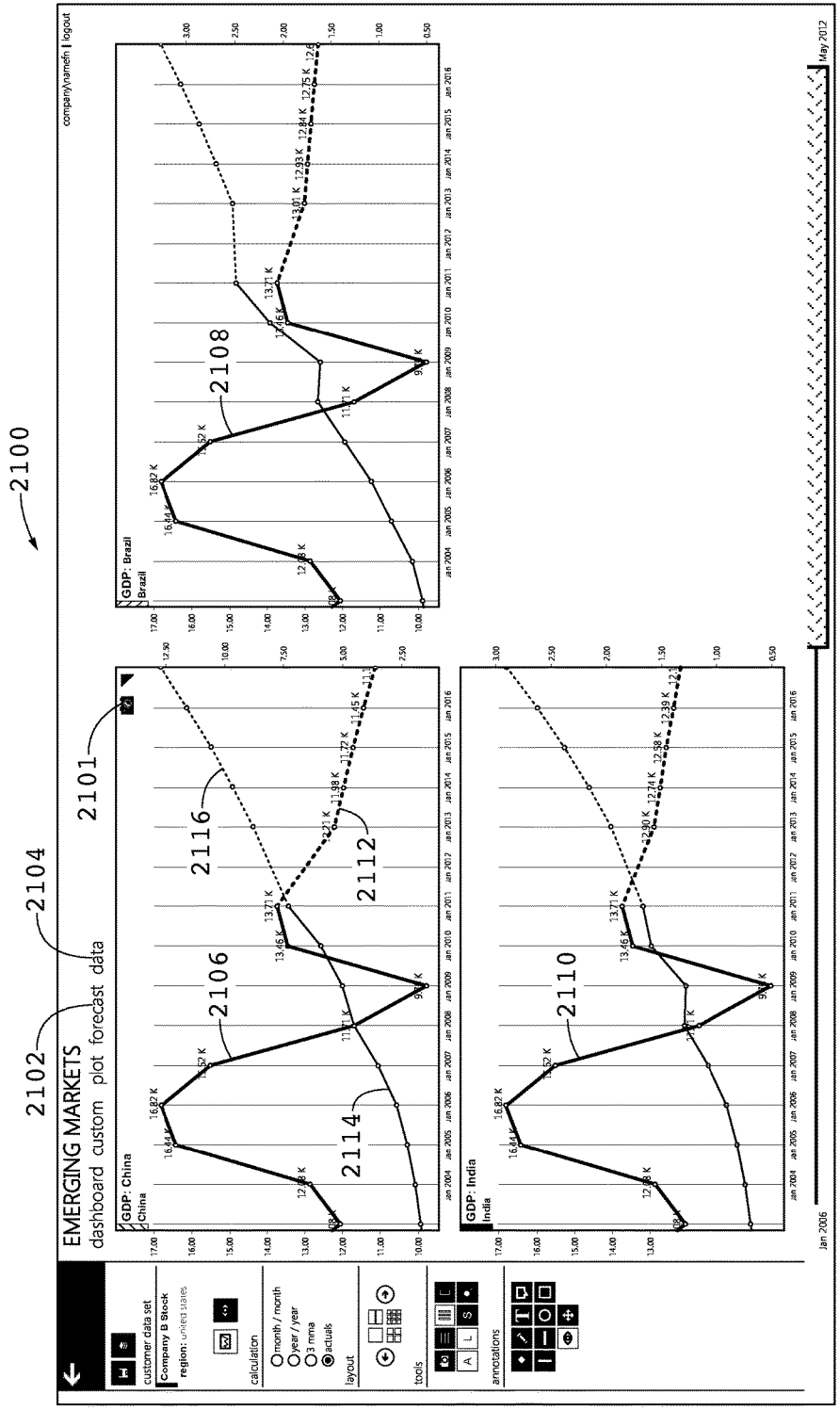
FIG. 21 shows exemplary instances of charts produced through the use of the system forecast functionality to identify probable future behaviors of target metrics.

These and various other tools known in the art, such as show/hide axis labels, data point labels, and horizontal and vertical grid lines are integrated directly into the analysis software for quick and efficient data manipulation and gives a user the ability to visualize the relationships between the metrics. Other tools can also make the task of analyzing, documenting, and presenting results by offering a screenshot button (see 2101 in FIG. 21, for example) in all chart areas for quick export of a particular view in one of many digital formats suitable for direct insertion into, for example, slideshow software. Further more, line-smoothing options and drop shadow additions can be performed on data series curves in order to enhance the readability and visibility of the metric relationships.

Another important aspect of the present system and methods utilizes forecasted econometric data in conjunction with the nature of the relationship between two metrics to provide valuable projections of a company's internal metrics. Returning to the report described in connection with the plotting function in FIG. 16, FIG. 21 displays a forecast function 2100 accessible via the forecast menu item 2102 in the report menu bar 2104. The forecast function is available for data sets for which forecast data are reported. In the example data set shown in FIG. 21, the GDPs of China, Brazil, and India have been projected (either internally, or via an external third-party source obtained by the business) through the year 2016. The bold curves 2106, 2108, and 2110 show the actual GDP values for China, Brazil, and India, respectively. The broken line portion of the curves, as at 2112, represents the forecasted portion of the metric, 2106, for example. The internal metric is shown as curve 2114.

Based upon the indicator and cyclic relationship characteristics gleaned through analyses carried out via the dashboard, custom, plot, and data functions, the future performance of the internal target metric 2114 can be projected given the indicator metric projections. The projection is shown in the upper left chart as the broken-line continuation 2116 of curve 2114, for instance. The ability to quickly forecast internal metrics after using the current system and methods to determine the precise relationship between internal, or target, metrics and external, or indicator, metrics is valuable to any decision-maker. Furthermore, as will be described more fully in detail below, the periodic updating of real and projected metrics as they are released allows businesses to stay on the cutting edge of the most recent data. Such quick reaction times can often make significant differences in profits gleaned from an economic change.

Figure 22:
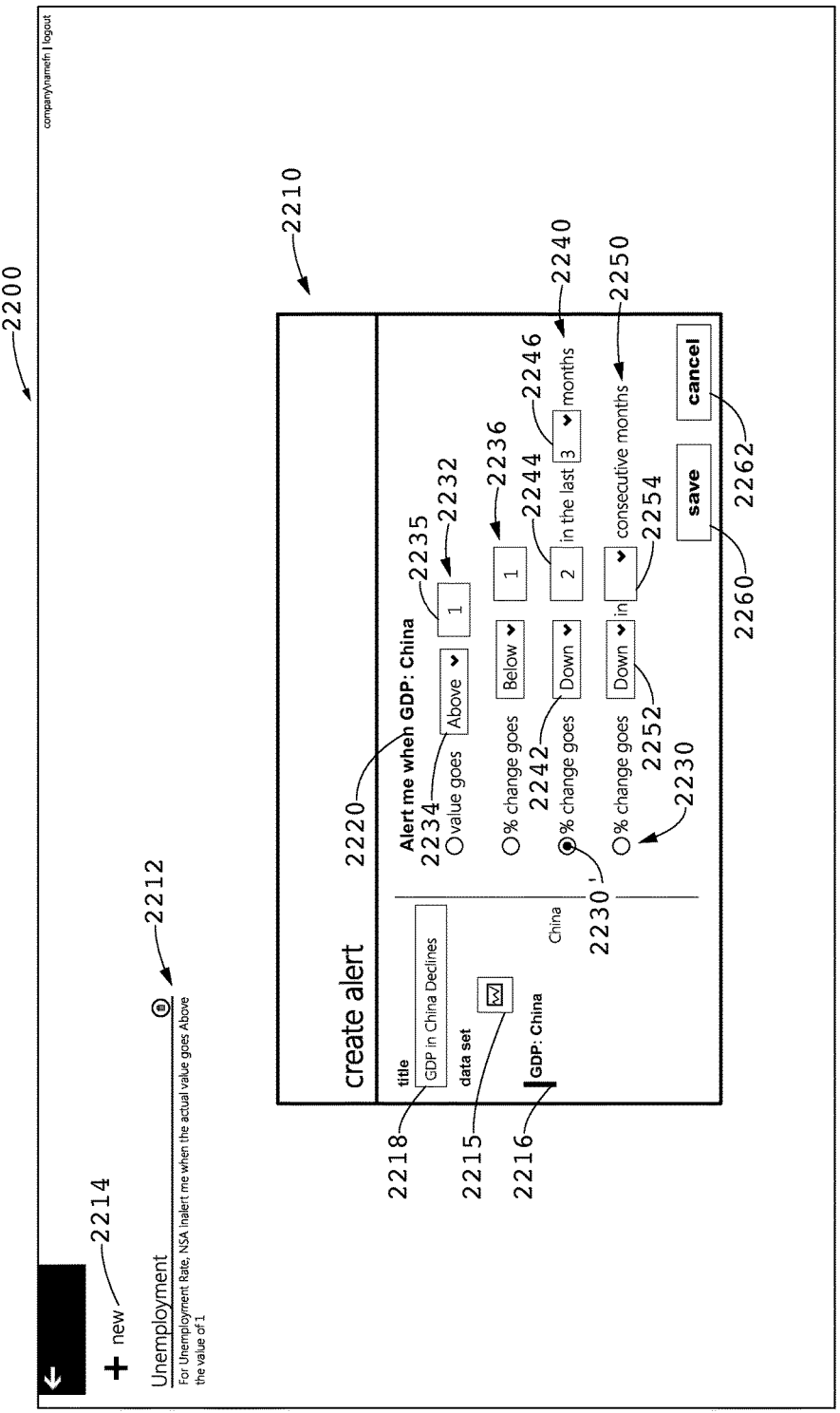
FIG. 22 shows the alerts screen that is activated by the ALERTS link.

The system as embodied herein provides the economist or business analyst a variety of tools with which to analyze a variety of economic data and company performance metrics. By utilizing the reporting and analyses functions described above, the changes of particular metrics and econometric data can be useful for drawing the system user's attention to a particularly useful or important change in the underlying, or indicating, data. The system provides the user the ability to identify and set action levels for changes, or movement above trigger points in data sets. Activation of the ALERTS link 316 of HOME screen 300, as shown in FIG. 3, launches the alerts component of the system. FIG. 22 shows the alerts screen that is activated by the ALERTS link 316. Alerts screen 2200 is arranged with an organization consistent with other interface screens of the system. The alerts home screen may display a create alert interface 2210, along with a table of existing alerts 2212, and a link 2214 to activate the new alert interface 2210. As shown in screen 2200, the new alert link 2214 has already been activated.

FIG. 22 shows a detail view 2200 of the create alert interface at 2210. Interface 2210 provides a facility to choose a data set 2215 to be monitored for issuing an alert. As shown in interface 2210, the selected data set is "GDP: China" at 2216. The data set panel launches an interface allowing the system user to choose available data sets to be monitored for an alert. The user may enter a descriptive title for the alert in dialog box 2218, with the title suitable for display in the alerts table as at 2212. The create alert title at 2220 announces to the user the data set being monitored or diagnosed by the alert system. A series of check boxes, as shown generally at 2230, allows the user to select the parameters which will trigger an alert. Note that a single check box is activated at 2230', although the system can be configured to issue an alert upon the triggering of one or more parameters. Parameter 2232 is shown as an absolute limit parameter, wherein a given value can be selected through menu 2234 and trigger the alert by one or more of above, below, or equal to a value entered into value dialog box 2235. If the parameter limit is satisfied, then an alert is delivered to the system user by a messaging component, such as via text or email.

Parameter 2236 is an instantaneous percentage change of the metric between time periods in one or more of above, below, or equal to a value entered into the parameter change dialog box.

Parameter 2240 is shown to be a change over a given unit of time alert function. The direction of change is set via menu 2242, with a limit value set by limit value dialog box 2244. The period of change over which the limit value of change is to be determined is sent via dialog box 2246.

Parameter 2250 is a variation of a change over a given unit of time alert, with menu 2252 allowing selection by the system user of the direction of the change, and dialog box 2254 being set to a selected number of consecutive months. It will be apparent that after implementing the availability of data set analysis and the setting of alerts by the system shown in FIG. 22 that a number of other parameters may be made available to the user by modifying the interface shown accordingly. Button 2260 allows the alert parameters to be saved (and later displayed in the Alerts table 2212), or the set up of a new alert to be canceled by button 2262.

Figure 23:
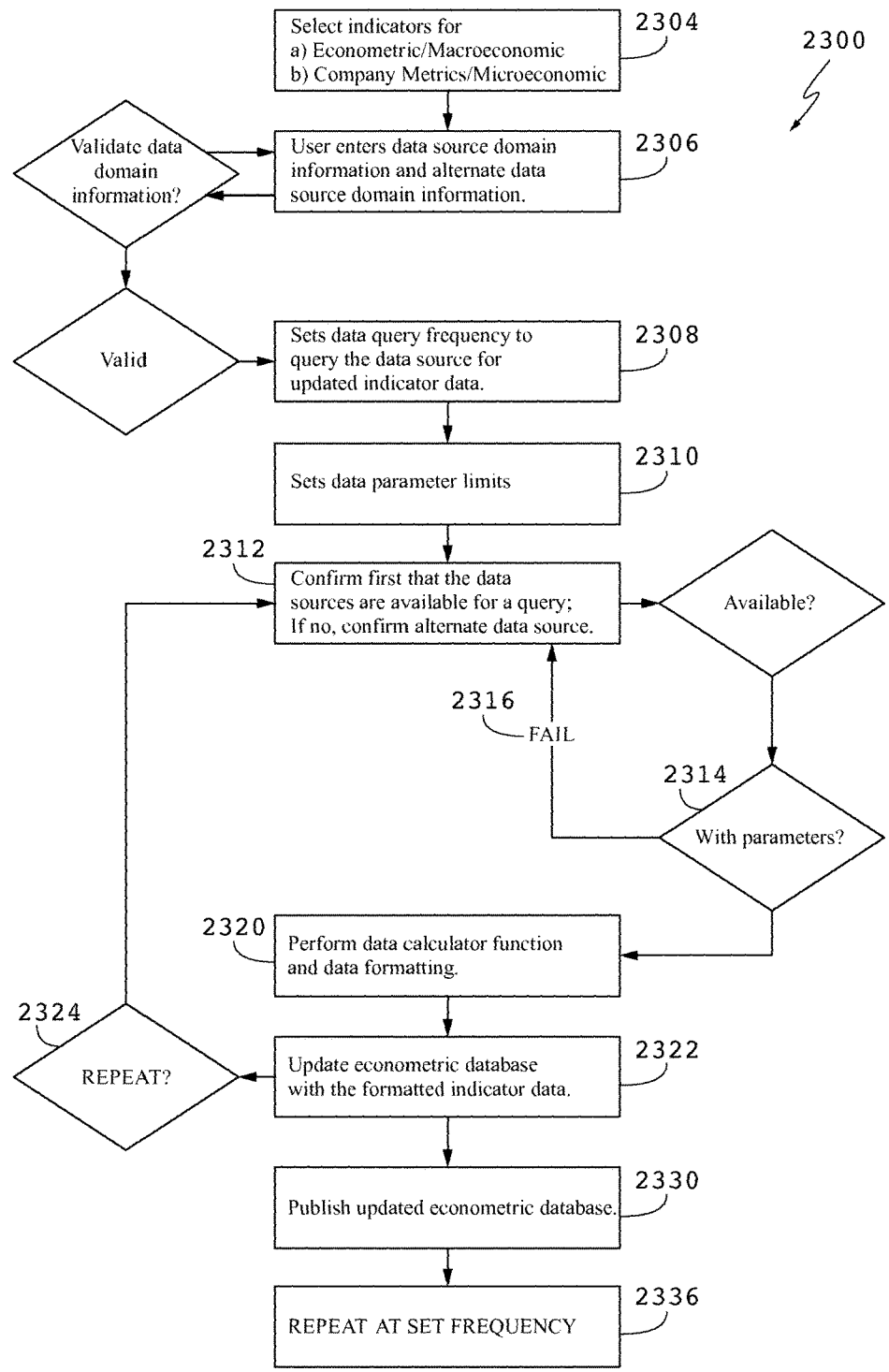
FIG. 23 demonstrates the data aggregation component of the system.

FIG. 23 demonstrates the data aggregation component of the system, the process of collecting financial, demographic, or statistic information and aggregating it into a relational database to interface with a database accessible to a system user. The aggregation system is specialized to allow system user selection of important econometric factors, thus providing economic data comprising an automated econometric database reporting selected data. The customer provided database is interfaced to the customer's internal finance software to collect financial results. Once both sets of data are collected an analysis is performed that identifies if an indicator appears to be leading, coincident with, or lagging the internal results as well as if its direction of movement is procyclic, acyclic, or counter-cyclic. The results are presented to users in a web-based chart for review. Additionally forecasted indicators are used to forecast company results and are displayed in software-based charts for users to review.

To create the data aggregation set, the system users completes the steps in flow chart 2300. Selecting indicator data aggregates the econometric database, said indicator data comprising two or more target metrics, i.e. internal company or industry data, and selecting two or more macroeconomic indicators or indicator metrics, i.e. econometric data, or external data metrics, such as published national or international data sets. See step 2304. For each econometric data set, the user enters data source domain information and alternative data source domain information (2306). Typically this domain information will be an internet protocol address, file path, or database entry. The user then sets a chosen data query frequency with which to query the data source for updated econometric data (2308). The data query frequency can be determined by the frequency of the database updating, by the schedule of data release, or by relating back to a triggers, such as an alert function trigger. To improve the reliability of the data aggregator and avoid error that could disrupt data aggregation, prior to obtaining the updated indicator data, i.e. retrieving updated data from a data source, the system can be configured to confirm first that the data sources is available for a query (2310), and then once the data is retrieved from the data source, the data aggregator determines whether the indicator data is within limit parameters (2312). If the retrieved data i.e., the projected updated indicator data is not within the predetermined limit parameters, the system may query an alternative database (2314). After the updated data is retrieved, it may be held in data buffer to confirm that the limit parameters are satisfied prior to updating the data acquisition database with the newly retrieved data. Thus, the system engages in an error correcting process for querying the data source to obtain updated indicator data. Only after confirmation of data quality is the econometric database updated.

Following parameter limit confirmation, the updated indicator data is then processed through a the data metric calculator function (2320), with the function setting the calculated value of the data metric, so that the units and scale of the data metric are compatible with the database and the functions to be performed with that data. Performing the metric calculator function produces formatted indicator data. Once the formatted indicator data is prepared, the system then proceeds with updating the econometric database with the formatted indicator data (2322). The data aggregator system can then repeat (2324), for all indicators present in the database (i.e., return to step 2307), the steps of repeating the data source querying, indicator metric calculator loading, calculating function, and updating the econometric database until all selected indicator data has been updated. The aggregated data is publishable as an updated econometric database (2330). The updated (aggregated) econometric database is useful for a number of economic forecasting and review systems, and could readily be utilized with the alert system described herein. More importantly the actively updated econometric database is particularly useful with the graphical display and forecasting functions described herein.

Figure 24:
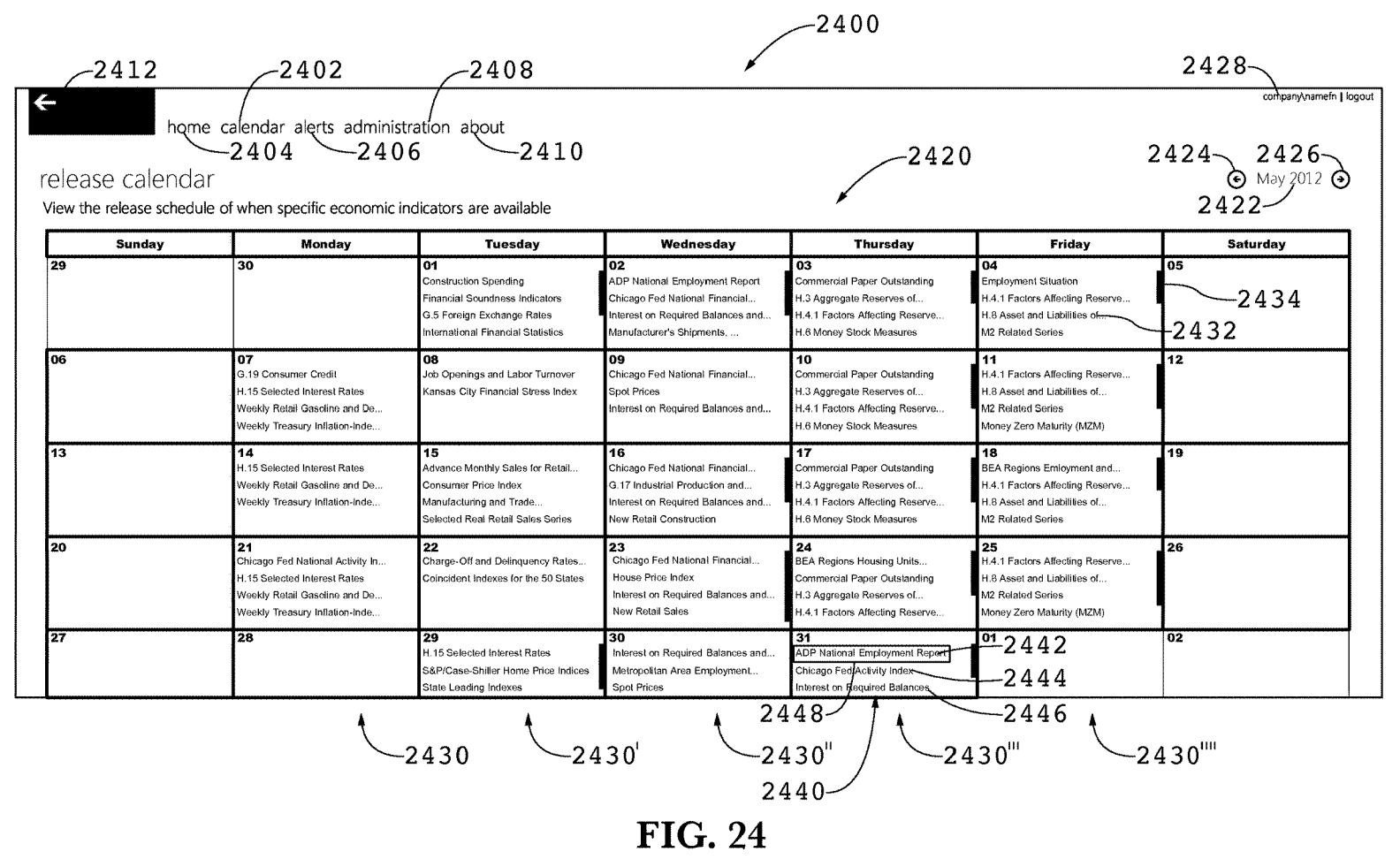

A variety of published econometric data sources are available. From the HOME page, clicking on the data set radio button opens up a pop over window for the data aggregation interface. As shown in FIG. 24A, data aggregation interface 2400 provides a system user interface with a number of radio buttons that allow the system user to navigate the data aggregation interface. Activation of the CALENDAR link button, 2402, launches a calendar display that can be toggled to display the external or internal data sets that are released on a calendar based schedule. The HOME button 2404, when activated, links the user back to the system home page that is published to the user after entry of a valid user name and password, as shown in FIG. 2. The ALERTS link button 2406, reverts the system user to the alerts interface, while the ADMINISTRATION 2408 and ABOUT 2410 buttons directs the system user to the administrative interface and the general information interfaces respectively. When the CALENDAR link 2402 is launched a data selection calendar 2420 is displayed. A back button 2412, may also be provided. Calendar title display 2422 is configurable to display the period of the calendar currently selected, such as the month May 2012, and selection arrows 2424 and 2426 allow the user to advance or retreat the period displayed, with the default period being the calendar period currently being displayed. Header panel 2428 announces the user log in information, and provides a facility for logging out of the system. As shown in FIG. 24A, the predicted day of release of a particular econometric data set is displayed each business day 2430 to 2430''''. Typically the calendar will be configured to display the business day the indicated data sets are to be released, and the calendar can optionally display at GMT or local time. If using local time, distant data releases may display on Saturday or Sunday in US markets. There are an extensive panoply of available sets of data, with the calendar showing for instance, external econometric data sets such as construction spending, financial soundness indicators, G5 foreign exchange rates, collected international financial statistics, job openings/labor turnover, Kansas City Federal Reserve Financial Stress Index, advance monthly retail sales, consumer price index, charge off and delinquency rates, coincident indexes for 50 US states, selected US interest rates, Case-Schiller home price index, and state leading indices, all being expected to be released on Tuesday in May 2012. Those skilled in the art will recognize that the schedule of data releases may vary periodically, and the list of indices shown in calendar 2420 is not exhaustive. Nonetheless, economists recognize that the number of data sets available can defy the ability of an economist to select relevant data for analysis. Thus one of the great advantages of the system is an econometric data set selection tool.

The calendar version of this tool, as shown by calendar 2420 allows access to daily data report predictions, such as reports projected for Friday May 4, 2012, as box 2432. On occasion, the number of available data sets for a day may be greater than can readily be displayed on a single calendar page. Thus, certain days are provided with a scroll bar as at 2434, to allow selection of a data set. Box 2440, representing May 31, 2012 provides for three data sets, including the "ADP employment report," link 2442, "Chicago Fed activity index," 2444, and "interest on required balances" 2446. Clicking on link 2442, highlights ADP national employment report at box 2448, and inclusion of the selected data set is added to the system user's data set selection by a click on link 2448. Following selection of the data sets a system user desires to utilize with the system, the calendar may be republished as shown by interface 2400 in FIG. 24B as calendar 2450. Calendar 2450 displays the system user's data selections that will be available for utilization in reports, alerts and further data analysis. Panel 2422 indicates that the release calendar is for July 2012. Calendar 2450 displays a number of selected data sets, in particular, for instance, Tuesdays are displayed by column 2454, with Tuesday July 3 being indicated as box 2456, with a full report being scheduled, Tuesday July 10 at box 2458 showing the selections of Job openings/labor turnover, and Kansas City Fed Finance index. Box 2460, representing Tuesday July 17, shows a selection of "Consumer Price Index." It should be recognized that an advantage of the disclosed system is a method to select optimal data sets for analysis, and the graph publishing module of the system can be repeatedly accessed with different data set selections, in order to separate relevant data sets from available data sets that simply contribute to additional noise. Thus, the system allows the user to select those data sets that provide useful correlations, and separate out those data sets that are essentially chaff.

Figure 25A:
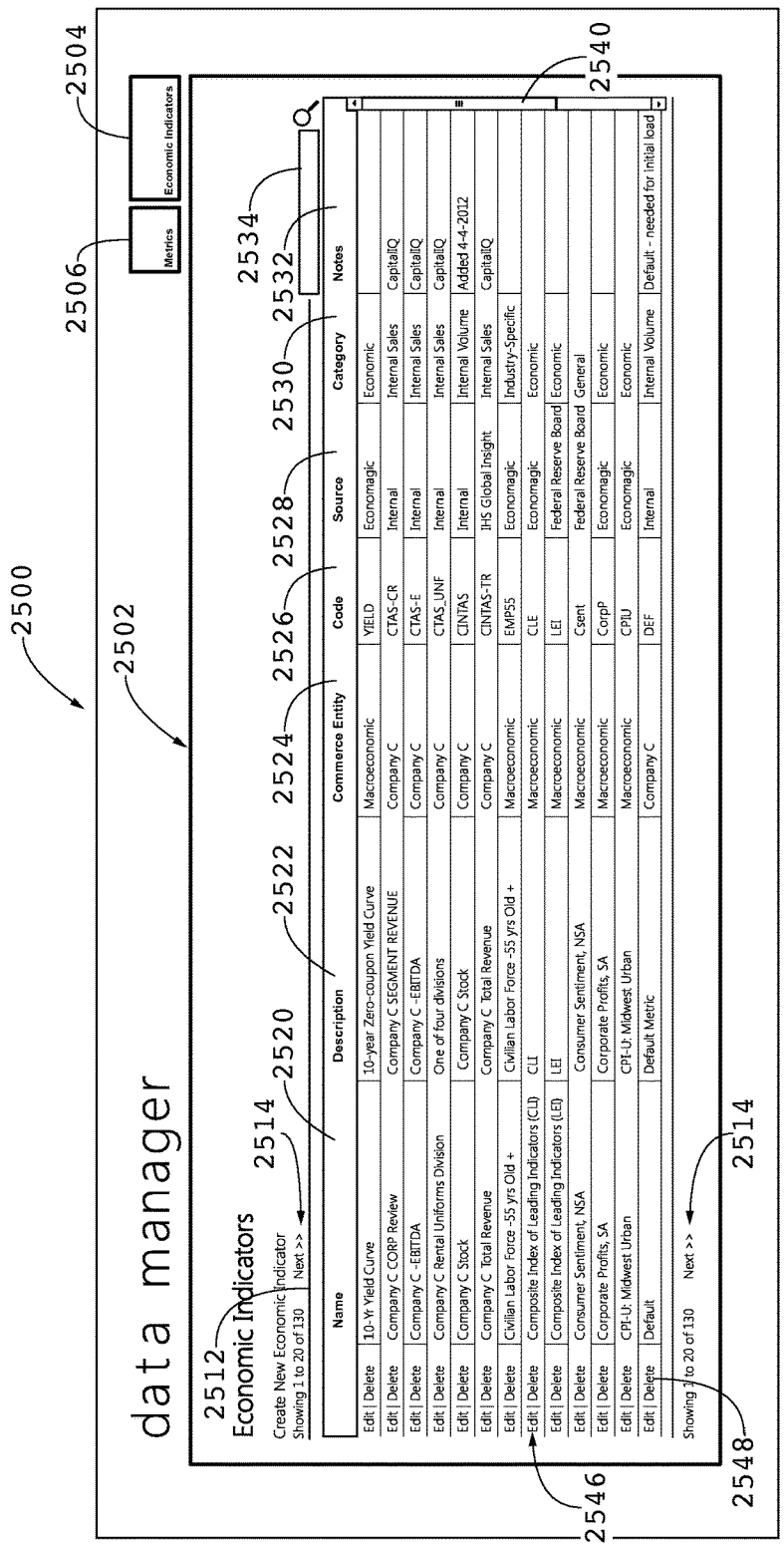
FIGS. 25A-C and 26A-C show the data manager interface.

When the user activates the "data set" link on the graphing page, as shown in FIG. 15, for instance, or by activating the back 2412 or home button 2404, the data manager interface is displayed. FIG. 25A shows the data manager interface 2500. Interface 2500 displays the data manager screen 2502, which may display alternatively external econometric data, by toggling ECONOMIC INDICATOR button 2504, internal company metrics, by toggling METRICS button 2506, or optionally both data sets, by activating both buttons 2504 and 2506. The report title indicates that interface 2502 is displaying economic indicators, with information on those selected data sets being listed in the table below. Panel 2512 indicates that there are a number of indicators, not all of which may be adequately displayed on a single screen. Thus, upon activation of any NEXT button 2514, the next page or screen of indicators will be displayed, and the panel 2512 updated to indicate the position the user is displaying in the economic indicators list. The table in screen 2502 is comprised of a number of data columns, including NAME columns 2520, DESCRIPTION column 2522, COMMERCE ENTITY columns 2524, user data set CODE column 2526, data SOURCE column 2528, data CATEGORY column 2530, and a NOTES column 2532. A scroll bar, as at 2540 may be provided. The particular columns displayed and their data types can be configured to fit the needs of a particular user.

Figure 25B:
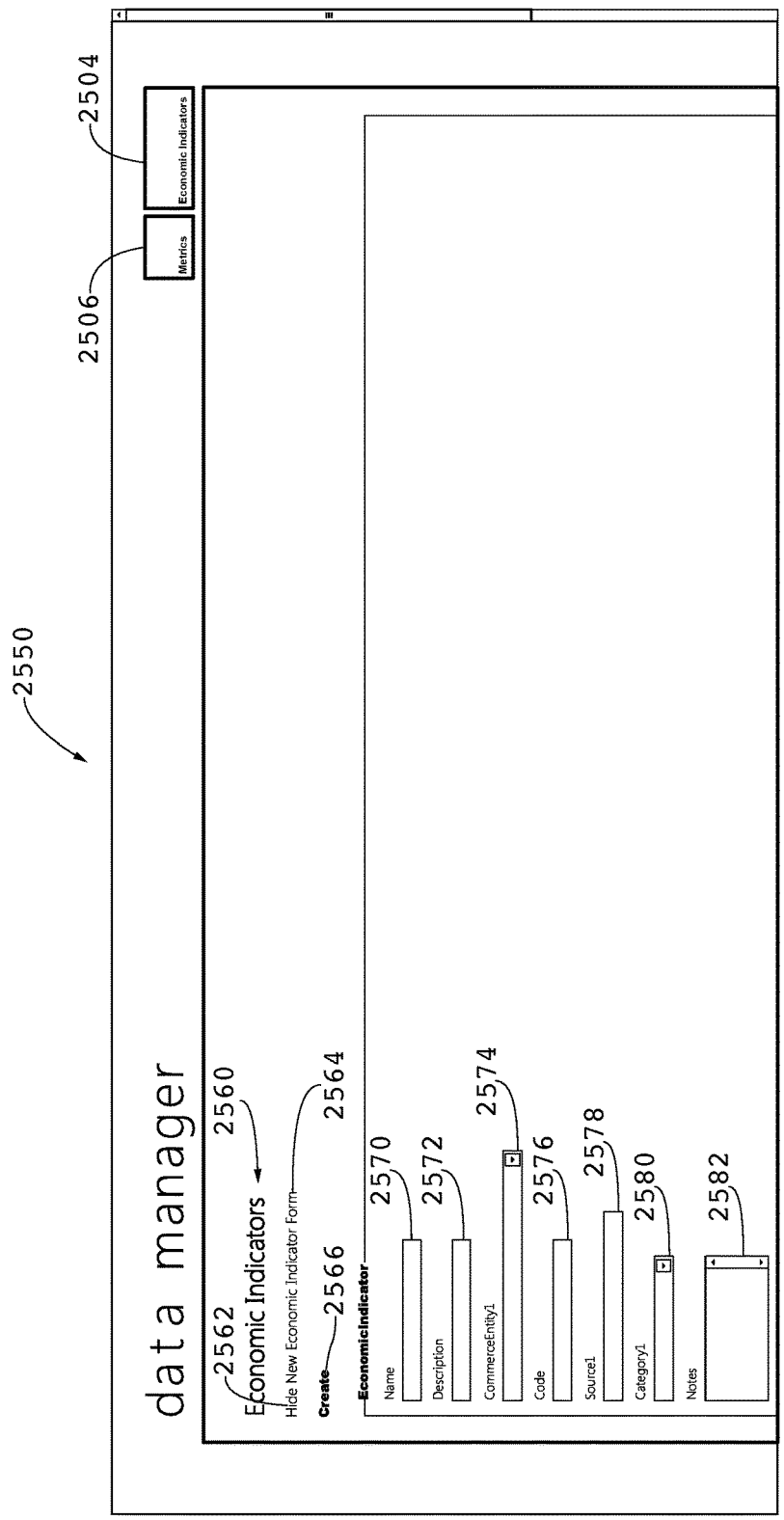

The display of the data sets can be edited by activating EDIT link 2546, or deleted by activating DELETE link 2548. If the DELETE link is activated, typically a warning and confirmation box will be provided before deletion of the data set from the user's profile is completed. Activating the edit link 2546 opens a form window, as shown in FIG. 25B. FIG. 25B shows popover window 2550 as part of the data manager interface, and allows the system user to edit the data that is displayed for an indicator in the data manager interface. Window title 2560 indicates to the user that the economic indicators edit menu is displayed in interface 2550. Links 2562, 2564, and 2566 allow the user to close the EDIT window, create a new indicator form, or create a new data field, respectively. Thus, the display columns as shown in panel 2502 of FIG. 25A are populated by the data entered into fields 2570-2582, name 2570, data set description 2572, the commercial source of the data set 2574, whether commercial, calculated, or internal metrics, a short code indicating data type 2576, the data source 2578, a source category 2580, and relevant notes concerning the data set 2582. Although interface display 2550 shows only rudimentary data fields, these fields are customizable at the user's discretion, and thus additional fields, or more complex data can be provided. In particular, the source field 2578 may be configured to act as a script for accessing the data source, such as by entering an IP address for an external econometric data set, or a file name and path for an internal customer metric. Alternatively, the source field 2578 may be populated with a list of available data sets for the particular user to choose from, making them available when creating reports.

Figure 25C:
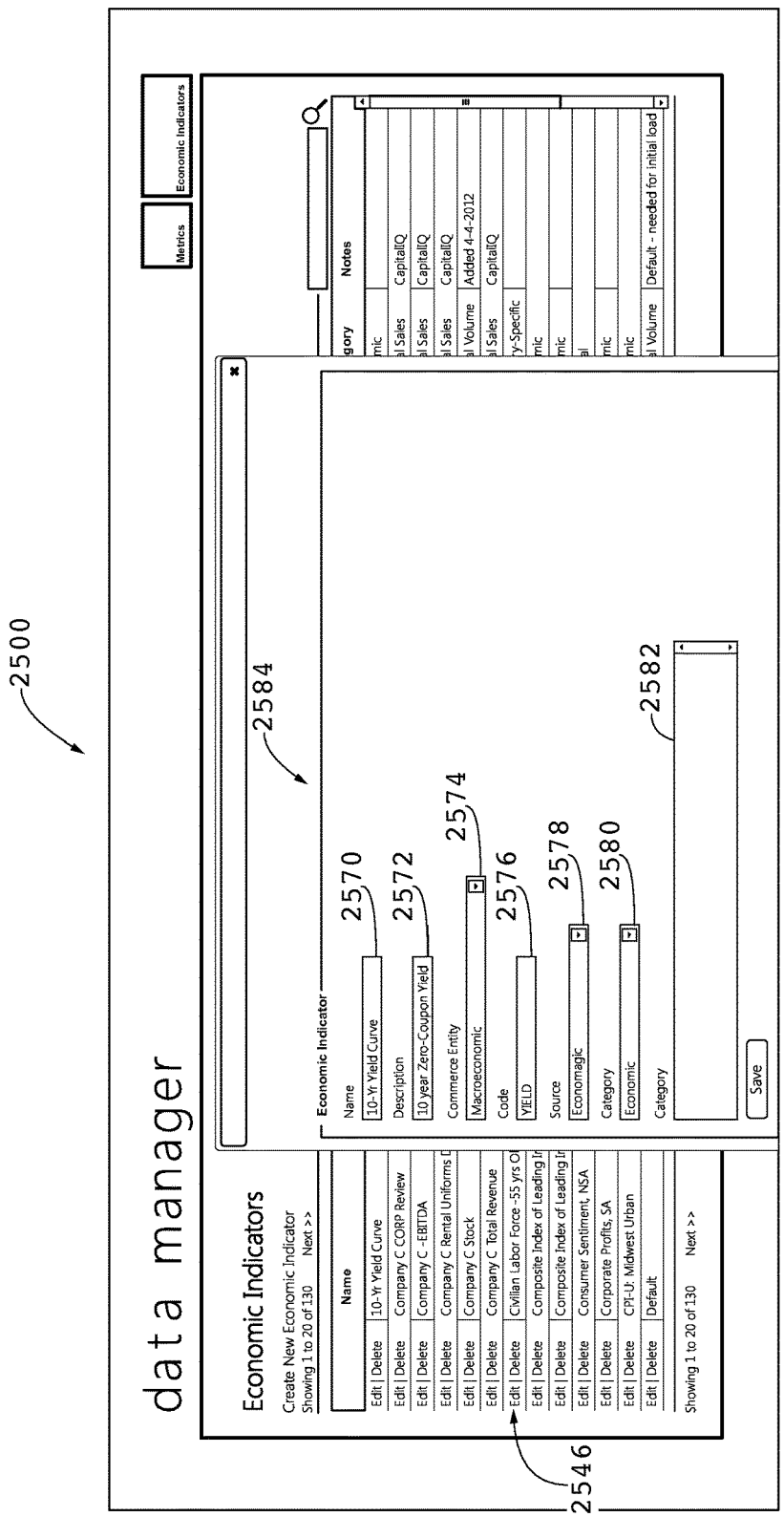

Similarly, FIG. 25C depicts an economic indicator edit box 2584 when a system user chooses an EDIT button 2546 for a particular data set. The edit box 2594 is pre-populated with the information already entered when the particular indicator was created (as shown in FIG. 25C, the 10-Yr. Yield Curve indicator), displaying an indicator name 2570, indicator description 2572, the commercial source of the indicator 2574, whether commercial, calculated, or internal indicator, a short code indicating data type 2576, the data source 2578, a source category 2580, and relevant notes concerning the indicator 2582. Choosing the SAVE button will save the edits and return the user to the data manager screen 2502 in FIG. 25A.

Figure 26A:
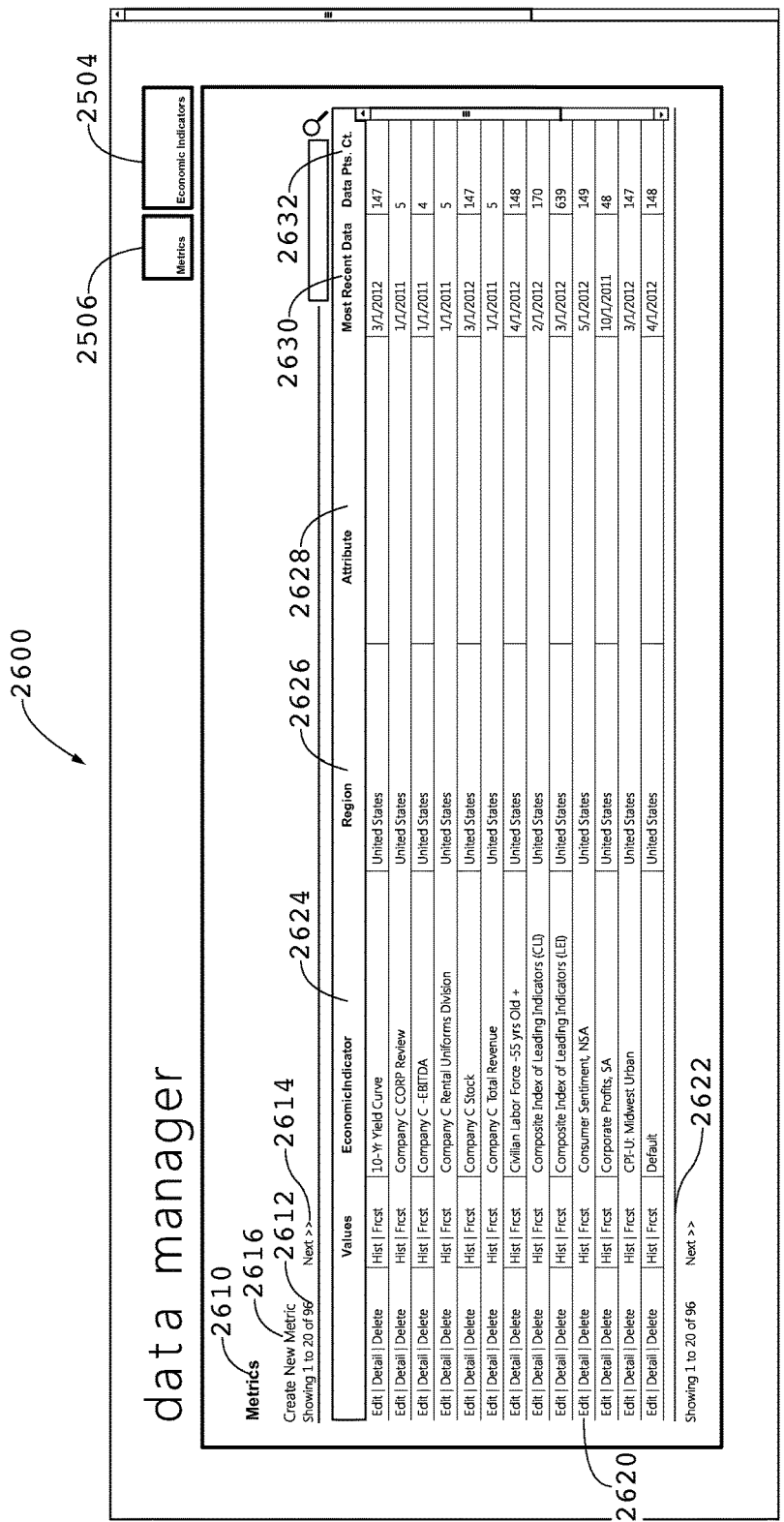

Activation of button 2506 launches a separate data manager interface, interface 2600 shown in FIG. 26A. Interface 2600 displays interface title "metrics" at 2610, shows the number of data sets at 2612, and allows movement through the data screens by NEXT button 2614. If a new data set is desired to be added, link 2616 may be activated. The metrics interface 2600 is similar in organization to the Economic Indicators interface 2500. The particular columns included can be customized at the system user's option, with column 2620 allowing editing, deletion, or display of additional detail for a given metric. Also shown are a Values column, 2622, a name column 2624, a geographical region column 2626, an attribute column 2628, a Date column 2630 and a data point columns 2632. Values column 2622 allows the user to toggle between historical data available in the database, and forecasted data that is forecast according to formulas derived by the system or available commercially from a given data set. Column 2628 does not display data as shown, which may be due to disuse of that column, or because the column displays data only when said data is particularly relevant. The most recent column 2630 is shown as displaying the date at which the most recent data for a given metric was updated, but could also indicate an age in days or years, an oldest date, or other calendar data the user desires to have displayed. In interface 2600, the quantity of individual data point in a set is shown in column 2632, allowing the user to discern a relative activity or reliability of a particular data set.

Figure 26B:
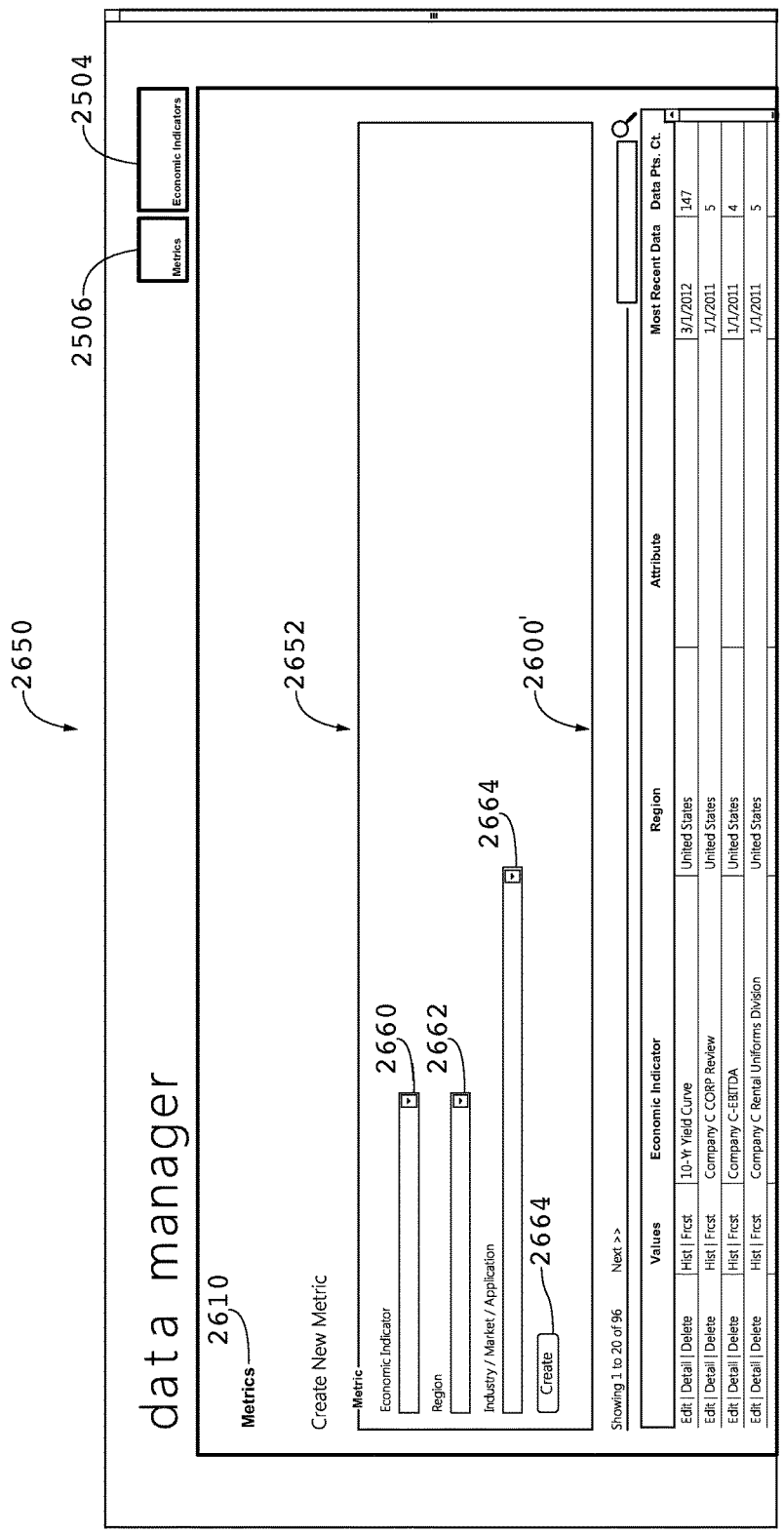
Figure 26C:
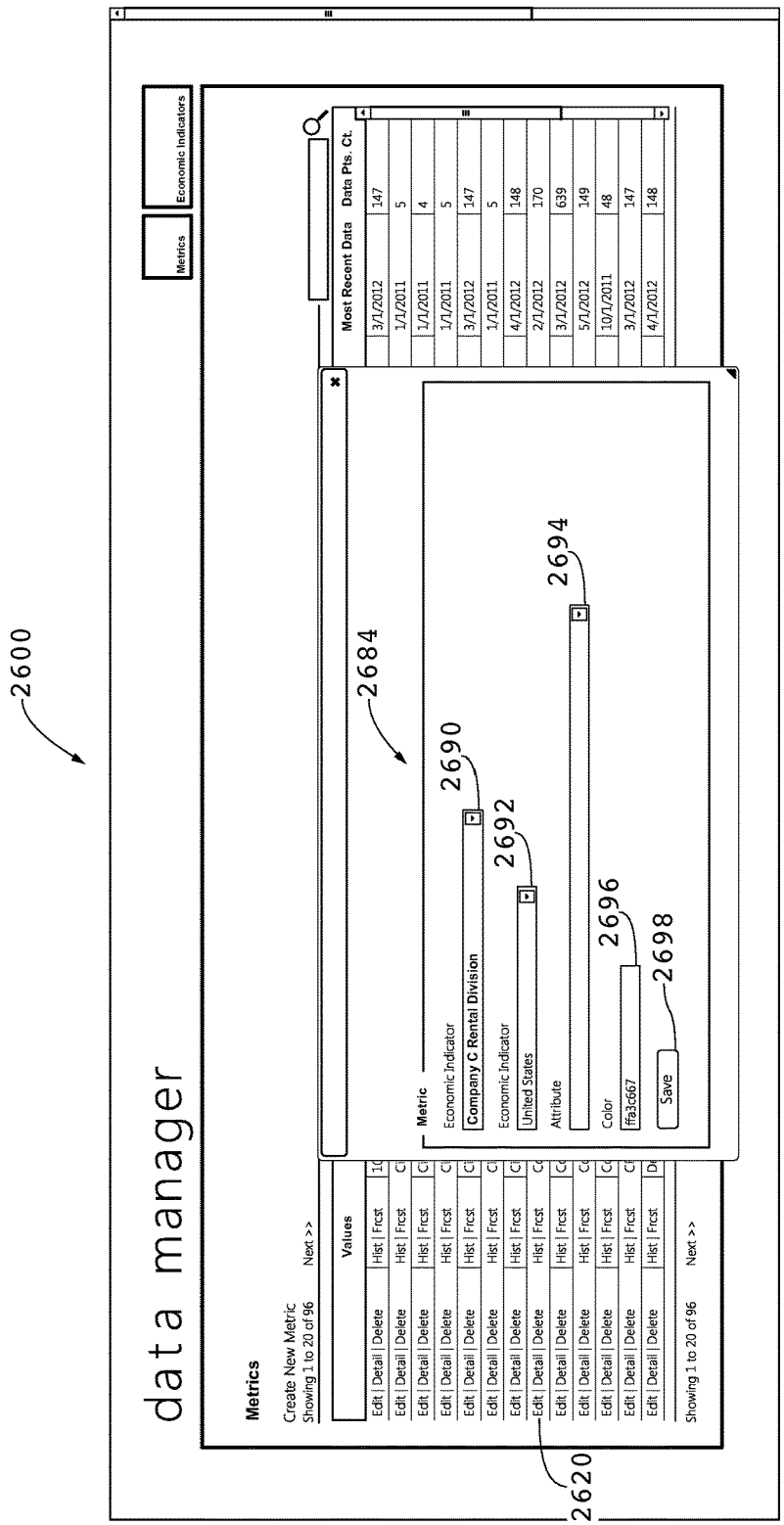

Activation of link 2616, as shown in FIG. 26A, launches a "Create new metric" dialog box, as shown by interface 2650 of FIG. 26B. The title 2610 indicates that the user is attempting to add a new metric to the system. The "Create new metric" information window 2652 is opened above the metric data tables shown below the information window lower outline 2600'. The information window 2652 contains economic indicator 2660, region 2662, and industry/market/application 2664 fields. After the user enters the appropriate information into each field and presses the CREATE button 2666, the new metric will be created and added to the now-updated metrics interface 2600. As with FIG. 26A, the particular columns included can of course be customized at the system user's option. As with the indicator editing process shown in connection with FIG. 25C, the editing process for a metric is shown in FIG. 26C. Choosing the edit link 2620 from the data manager screen 2600 opens metric editing box 2684. The editing box contains various user-definable fields regarding the metric, such as but not limited to, a name 2690, data set 2692, attribute 2694, and color code 2696 for representation of the metric on the report screen. Clicking the SAVE button 2698 will save the edited metric and return the user to the data manager 2600.

Figure 27:
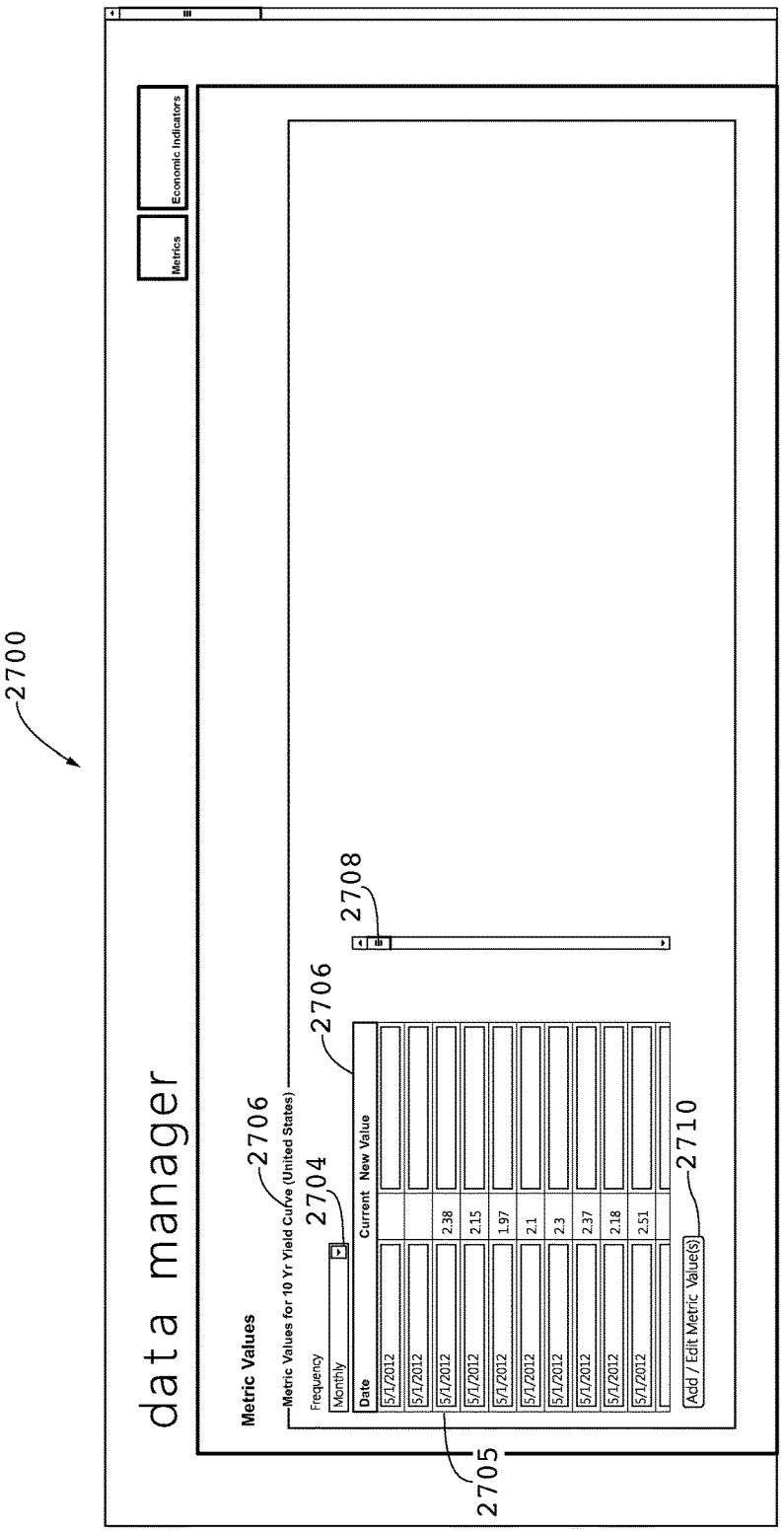
FIG. 27 shows the manual data entry functionality for econometric data series in the data manager.

FIG. 27 depicts an alternative, manual process for entering an econometric data set. Metric Value screen 2700 is provided to the user for entering discrete metric data in tabulated form for use in a report. If the metric is already titled, the metric title will appear, as at 2702. The system user selects a periodic frequency defining when the metric is reported, collected, or measured at 2704. The metric data entry table 2705 has a header row 2706 with column labels of date, current metric value, and new metric value. In the rows of the table 2705, the system user enters a date for a particular data point, a new value to change an existing data point, or a new value and new date to enter a new data point to the metric data set. A scroll bar 2708 can be provided for tables with many entries. After completing the data entry or data edit, the system user clicks on the ADD/EDIT button 2710 to save the data.

This manual method of data entry can be useful, for example, when dealing with small data sets, making it easier to enter by hand than to set up automatic routing and collection of data. It is particularly useful when forecasts of internal metrics are gleaned from utilization of the system and method. A system used can input projected internal forecast data to further analyze systemic effects in the system. Businesses in heavily regulated industry, such as the banking industry, will also find this capability useful when striving to meet regulatory demands, such as a requirement that banks prove theoretical viability of the business during a "stress test," in which many economic factors become greatly negative in a short period of time. Interest rates, cash reserves, and installment loan default rates are, for instance, able to be projected in a worst-case scenario. The business can then determine how its internal financial stability would be affected, and use the results to meet regulatory requirements for such types of analyses.

A final aspect of the disclosed system and methods is the ability for system users to delegate access to other users within an organization. From the HOME screen (FIG. 3) or elsewhere in the application, a user can access the administration function of the system by clicking the ADMINISTRATION link 318 in the menu. That choice leads the user to an administration screen 2800, as shown in FIG. 28A, for example. The administration screen 2800 displays an account table 2802 in turn containing a list of users who have been granted access to the application. Each account record is provided with edit 2804 and delete 2806 buttons for editing and deleting individual user accounts. The add user button 2808 is provided for adding a new user account, granting access to the system. The account table 2802 displays whatever desirable information about an account an administrator wishes to have displayed. For example, the account table 2802 can display, as in FIG. 28A, the account username 2810, the account user's first 2812 and last 2814 names, their email address 2816, the date and time the account was created 2818, and an account permission set 2820. Other useful data fields may of course be collected and provided regarding an individual account user as desired in a particular application.

The account permission set 2820 grants the administrator the authority to set permissions, or access levels, for other users of the system. For example, the administrator can enable or disable the access of a particular account with respect to the entire system, give read access to reports, write access for creating and editing reports, or allow the user to act as an administrator for other accounts. The administration functionality may also be used to created "data silos" for different econometric data sets within the business. Some companies, for instance, are very large, or hold highly sensitive data. In an effort to avoid data leaks, insider trading, and the like, further permission sets can be used so as to confine accounts to certain subsets of the entire data structure.

Figure 28B:
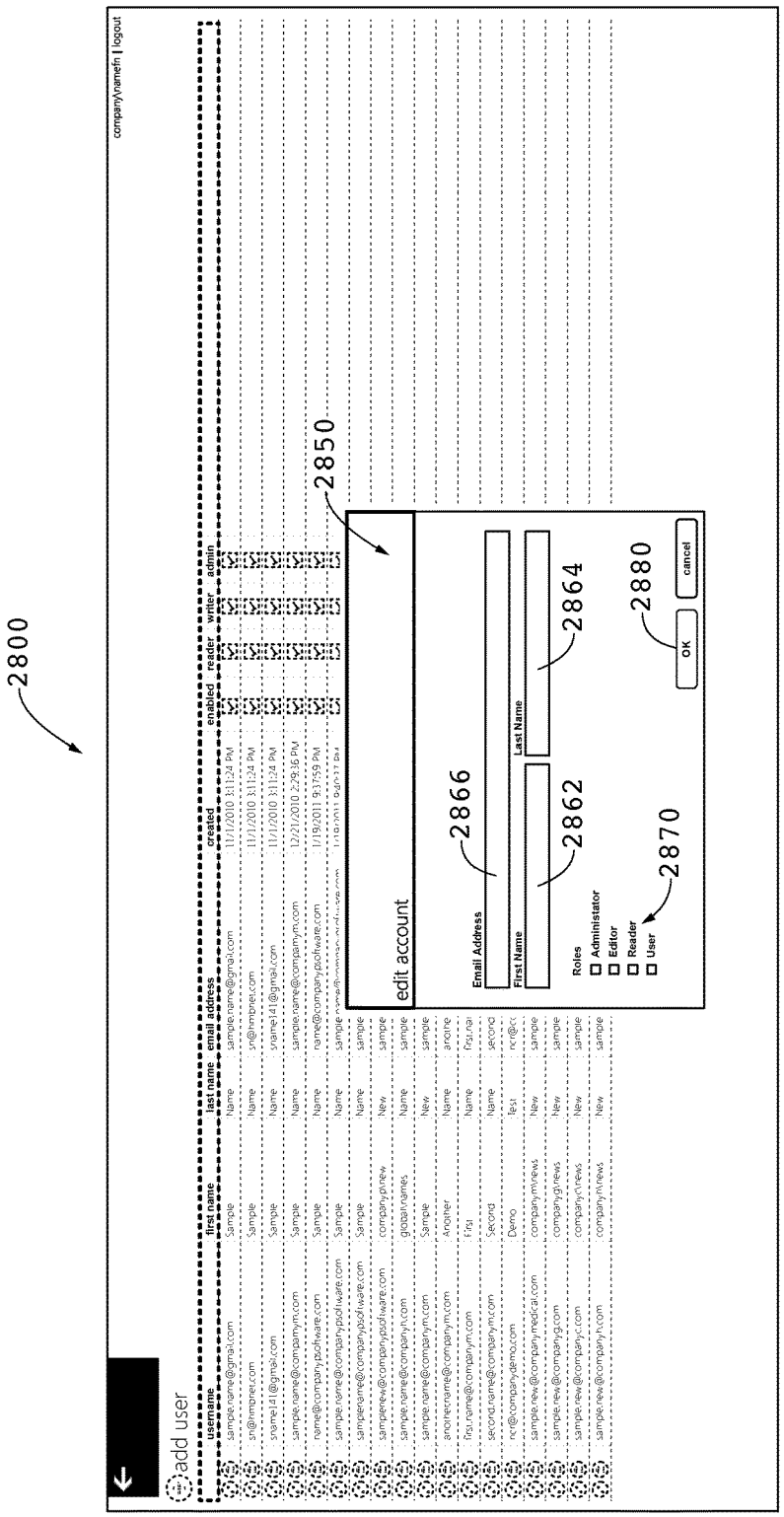

To edit an already existing user account, the administrator chooses the edit button 2804 for the row corresponding to the account the he or she wishes to edit. Turning to FIG. 28B, an edit account box 2850 will appear, allowing the administrator to edit the data fields corresponding to the account chosen. For example, the edit account box 2850 could have the account email address 2866 field, the user's first 2862 and last 2864 name fields, and the account permissions set 2870. After editing the account, the administrator selects the OK button 2880 to save the changes.

While the invention has been described with reference to preferred embodiments, those skilled in the art will understand that various changes may be made and equivalents may be substituted for elements thereof without departing from the scope of the invention. In addition, many modifications may be made to adapt a particular situation or material to the teachings of the invention without departing from the essential scope thereof. Since certain changes may be made in the above compositions and methods without departing from the scope of the invention herein involved, it is intended that all matter contained in the above descriptions and examples or shown in the accompanying drawings shall be interpreted as illustrative and not in a limiting sense. In this application all units are in the metric system and all amounts and percentages are by weight, unless otherwise expressly indicated. Also, all citations referred herein are expressly incorporated herein by reference. All terms not specifically defined herein are considered to be defined according to Webster's New Twentieth Century Dictionary Unabridged, Second Edition. The disclosures of all of the citations provided are being expressly incorporated herein by reference. The disclosed invention advances the state of the art and its many advantages include those described and claimed.

I claim:

1. A method of identifying economic indicators for use in business forecasting comprising:
measuring a collection of internal econometric data series;
retrieving at an application server from an internal data source via an aggregation server a first econometric data series selected from the collection of internal econometric data series, wherein each of the internal econometric data series comprises i) a time domain having a plurality of time values, and ii) a value domain having econometric data values for each of the time values in the plurality of time values;
computing a collection of forecasted econometric data series;
retrieving at the application server from an external data source via the aggregation server a second econometric data series selected from the collection of forecasted econometric data series wherein each of the forecasted econometric data series comprises i) a time domain having a plurality of historic time values and a plurality of future time values, and ii) a value domain having actual econometric data values for each of the time values in the plurality of historic time values and forecasted econometric data values for each of the time values in the plurality of future time values;

transmitting the first and second economic data series from the application server for display on a graphical display in a chart comprising:
  the first econometric data series plotted on the chart in a first position; the second econometric data series plotted on the chart; and
  a time domain shifting control for transposing the time domain of the first econometric data series;

receiving a shift magnitude and a shift direction at the time domain shifting control displayed on the graphical display;

generating a first time shift plot by replotting the first econometric data series in the chart in a second position by transposing the time domain of the first econometric data series by the shift magnitude and shift direction;

displaying on the graphical display one or more of a leading, lagging, cyclic, countercyclic, procyclic or acyclic relationship between the first and second econometric data series based on the shift magnitude and shift direction;

generating a second time shift plot by replotting the first econometric data series in the chart in a third position wherein the time domain of the first econometric data series further comprises a plurality of future time values corresponding to the plurality of future time values of the time domain of the second econometric data series, and wherein the value domain of the first econometric data series further comprises forecasted econometric data values for each of the time values in the plurality of future time values, wherein the forecasted econometric data values of the value domain of the first econometric data series are derived from:
  the displayed one or more of a leading, lagging, cyclic, countercyclic, procyclic or acyclic relationship between the first and second econometric data series; and
  the forecasted econometric data values of the value domain of the second econometric data series; and altering internal finances of an organization to meet regulatory requirements responsive to the forecasted econometric data values.

2. The method of claim 1 wherein the second econometric data series is one or more of GOP, GOP change, unemployment, unemployment change, stock market index price, commodity price, oil price, gasoline price, energy price, foreign trade, domestic production, AOP employment report, Fed activity index, prime rate, LIBOR, interest on required balances, national employment report, job openings, labor turnover, Fed Finance index, producer price index, or Consumer Price Index.

3. The method of claim 1 wherein the first econometric data series is a company metric being one or more of specific stock price, sales, production, inventory, cost of goods sold, demand, EBITA, average hours worked, hourly rate, marketing expense, or advertising expense.

4. The method of claim 1 wherein the method identifies a cyclic or countercyclic forecasting indicator.

5. The method of claim 4 further comprising a cyclic or countercyclic forecasting indicator with a correlation coefficient of between plus or minus 0.1 and 1.0.

6. The method of claim 1 further comprising determining whether lower and upper time domains are within outer boundary parameters, and when said time domains are outside outer boundary parameters, imposing a shift magnitude limit on the shift magnitude receivable at the time domain shifting control.

7. A method of identifying economic indicators for use in business forecasting comprising:
  providing an aggregation server programmed with one or more aggregation software routines executing on the aggregation server and configured to:
    measure a collection of internal econometric data series;
    store in a metrics database the collection of internal econometric data series wherein each of the internal econometric data series comprises i) a time domain having a plurality of time values, and ii) a value domain having econometric data values for each of the time values in the plurality of time values;
    compute a collection of forecasted econometric data series; and
    store in the metrics database the collection of forecasted econometric data series wherein each of the forecasted econometric data series comprises i) a time domain having a plurality of historic time values and a plurality of future time values, and ii) a value domain having actual econometric data values for each of the time values in the plurality of historic time values and forecasted econometric data values for each of the time values in the plurality of future time values;
  storing the collection of internal econometric data series and the collection of forecasted econometric data series in the metrics database via the aggregation server;
  providing an application server programmed with one or more application software routines executing on the application server and configured to access the metrics database in connection with a graphical display on a user device;
  retrieving at the application server from the metrics database a first econometric data series selected from the collection of internal econometric data series and a second econometric data series selected from the collection of forecasted econometric data series;
  transmitting the first and second economic data series from the application server for display on the graphical display in a chart comprising:
    the first econometric data series plotted on the chart in a first position;
    the second econometric data series plotted on the chart; and
    a time domain shifting control for transposing the time domain of the first econometric data series;
  receiving a shift magnitude and a shift direction at the time domain shifting control displayed on the graphical display;
  generating a first time shift plot by replotting the first econometric data series in the chart in a second position by transposing the time domain of the first econometric data series by the shift magnitude and shift direction;
  displaying on the graphical display one or more of a leading, lagging, cyclic, countercyclic, procyclic or acyclic relationship between the first and second econometric data series based on the shift magnitude and shift direction; and
  generating a second time shift plot by replotting the first econometric data series in the chart in a third position wherein the time domain of the first econometric data series further comprises a plurality of future time values corresponding to the plurality of future time values of the time domain of the second econometric data series, and wherein the value domain of the first econometric data series further comprises forecasted econometric data values for each of the time values in the plurality of future time values, wherein the forecasted econometric data values of the value domain of the first econometric data series are derived from:

the displayed one or more of a leading, lagging, cyclic, countercyclic, procyclic or acyclic relationship between the first and second econometric data series; and the forecasted econometric data values of the value domain of the second econometric data series; and altering internal finances of an organization to meet regulatory requirements responsive to the forecasted econometric data values.

8. The method of claim 7 wherein the second econometric data series is one or more of GOP, GOP change, unemployment, unemployment change, stock market index price, commodity price, oil price, gasoline price, energy price, foreign trade, domestic production, AOP employment report, Fed activity index, prime rate, LIBOR, interest on required balances, national employment report, job openings, labor turnover, Fed Finance index, producer price index, or Consumer Price Index.

9. The method of claim 7 wherein the first econometric data series is a company metric being one or more of specific stock price, sales, production, inventory, cost of goods sold, demand, EBITA, average hours worked, hourly rate, marketing expense, or advertising expense.

10. The method of claim 7 wherein the method identifies a cyclic or countercyclic forecasting indicator.

11. The method of claim 10 further comprising a cyclic or countercyclic forecasting indicator with a correlation coefficient of between plus or minus 0.1 and 1.0.

12. The method of claim 7 further comprising determining whether lower and upper time domains are within outer boundary parameters, and when said time domains are outside outer boundary parameters, imposing a shift magnitude limit on the shift magnitude receivable at the time domain shifting control.

* * * * *

UNITED STATES PATENT AND TRADEMARK OFFICE
CERTIFICATE OF CORRECTION

PATENT NO. : 10,176,533 B2  
APPLICATION NO. : 13/558333  
DATED : January 8, 2019  
INVENTOR(S) : Richard Chadwick Wagner Page 1 of 1

It is certified that error appears in the above-identified patent and that said Letters Patent is hereby corrected as shown below:

On the Title Page

Item (12), delete "Waner" and insert -- Wagner --.

Under item '(75) Inventor:', please delete "Waner" and insert -- Wagner --.

Signed and Sealed this  
Fourteenth Day of January, 2020

Andrei Iancu  
*Director of the United States Patent and Trademark Office*